US012802298B2

(12) United States Patent
Singhania et al.

(10) Patent No.: US 12,802,298 B2
(45) Date of Patent: Nov. 17, 2026

(54) VECTOR GRAPHIC PATTERN GENERATION

(71) Applicant: ADOBE INC., San Jose, CA (US)

(72) Inventors: Aditi Singhania, Raipur (IN); Vineet Batra, Delhi (IN); Yiwei Hu, San Jose, CA (US)

(73) Assignee: ADOBE INC., San Jose, CA (US)

( * ) Notice: Subject to any disclaimer, the term of this patent is extended or adjusted under 35 U.S.C. 154(b) by 112 days.

(21) Appl. No.: 18/821,427

(22) Filed: Aug. 30, 2024

(65) Prior Publication Data

US 2026/0065531 A1 Mar. 5, 2026

(51) Int. Cl.

| | |
|---|---|
| ***G09G 5/00*** | (2006.01) |
| ***G06T 5/70*** | (2024.01) |
| ***G06T 5/73*** | (2024.01) |
| ***G06T 11/10*** | (2026.01) |

(52) U.S. Cl.

CPC ................ *G06T 11/10* (2026.01); *G06T 5/70* (2024.01); *G06T 5/73* (2024.01)

(58) Field of Classification Search

CPC ... G06T 11/10; G06T 5/70; G06T 5/73; G06T 11/00

USPC .......................................................... 345/588

See application file for complete search history.

(56) References Cited

U.S. PATENT DOCUMENTS

| | | | | |
|---|---|---|---|---|
| 12,205,197 | B1 * | 1/2025 | Voroninski | G06T 11/10 |
| 2004/0008250 | A1 * | 1/2004 | Thal | H04N 13/239 348/E13.016 |
| 2009/0262136 | A1 * | 10/2009 | Tischer | G06T 11/00 345/629 |
| 2022/0270243 | A1 * | 8/2022 | Kikuchi | G06T 7/0012 |
| 2023/0377226 | A1 * | 11/2023 | Saharia | G06T 11/60 |
| 2024/0221242 | A1 * | 7/2024 | Greenen | G06T 11/10 |
| 2025/0285343 | A1 * | 9/2025 | Li | G06T 11/60 |

OTHER PUBLICATIONS

1Ho, et al., "Denoising Diffusion Probabilistic Models", 34th Conference on Neural Information Processing Systems (NeurIPS 2020), 12 pages, (Dec. 2020).

2Song, et al., "Denoising Diffusion Implicit Models", ICLR 2021, arXiv preprint arXiv:2010.02502, 20 pages, (May 2021).

4Visiwig, "Patterns," 2024, Found on the Internet: https://www.visiwig.com/patterns/.

6Adobe, "Text to Vector Graphic—AI Vector Generator—Adobe Illustrator," 2024, Found on the Internet: https://www.adobe.com/products/illustrator/text-to-vector-graphic.html#:~:text=Use%20the%20%7B%7Btext%2Dto,generate%20vectors%20in%20similar%20style.

(Continued)

*Primary Examiner* — Gordon G Liu

(74) *Attorney, Agent, or Firm* — F. CHAU & ASSOCIATES, LLC

(57) ABSTRACT

A method, apparatus, non-transitory computer readable medium, and system for image generation include obtaining a noise input and an input prompt comprising a pattern element. A coordinate frame of the noise input is shifted based on a diffusion step to obtain a shifted coordinate frame. A synthetic image is generated, using an image generation model, by denoising the noise input based on the input prompt and the shifted coordinate frame. The synthetic image comprises a repetition of the pattern element.

20 Claims, 17 Drawing Sheets

(56) References Cited

OTHER PUBLICATIONS

5P. Monster, "Pattern Monster—SVG pattern maker," 2024, Found on the Internet: https://pattern.monster/.
7Srivastava, et al., "Training Agents using Upside-Down Reinforcement Learning", arXiv preprint arXiv:1912.02877v2 [cs.LG] Sep. 3, 2021, 31 pages.
8Schmidhuber, "Reinforcement Learning Upside Down: Don't Predict Rewards—Just Map Them to Actions", arXiv preprint arXiv:1912.02875v2 [cs.AI] Jun. 23, 2020, 22 pages.
9Vecchio, et al., "ControlMat: A Controlled Generative Approach to Material Capture", arXiv preprint arXiv:2309.01700v2 [cs.CV] Sep. 25, 2023, 16 pages.
10Liu, et al., "Design Guidelines for Prompt Engineering Text-to-Image Generative Models", In Proceedings of the 2022 CHI Conference on Human Factors in Computing Systems, (Apr. 2022), (pp. 1-23).
11Ho, et al., "Classifier-Free Diffusion Guidance", arXiv preprint arXiv:2207.12598v1 [cs.LG] Jul. 26, 2022, 14 pages.
12Sastry, et al. , "Training Diffusion Classifiers with Denoising assistance", arXiv preprint arXiv:2306.09192v1 [cs.CV] Jun. 15, 2023, 18 pages.
13Chen, "On the Importance of Noise Scheduling for Diffusion Models", arXiv preprint arXiv:2301.10972v4 [cs.CV] May 21, 2023, 12 pages.

* cited by examiner

Without Noise Rolling

With Noise Rolling 500 505

Without Specific Anchor Prompt

With Specific Anchor Prompt

VECTOR GRAPHIC PATTERN GENERATION

BACKGROUND

The following relates generally to image processing, and more specifically to pattern generation using machine learning. Digital image processing refers to the use of a computer to edit a digital image using an algorithm or a processing network. In some cases, image processing software can be used for various tasks, such as image editing, image restoration, image generation, etc. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, involves the use of diffusion models to synthesize images. Diffusion models can be used for various image generation tasks including image super-resolution, generation of images with perceptual metrics, conditional generation (e.g., generation based on text guidance), image inpainting, and image manipulation. Specifically, diffusion models are trained to take random noise as input and generate unseen images with features similar to the training data. However, conventional image generation models do not accurately generate some kinds of images, including some pattern images.

SUMMARY

The present disclosure describes systems and methods for pattern generation. Embodiments of the present disclosure include an image generation apparatus that receives an input prompt comprising a pattern element and generates a synthetic image including a repetition of a pattern element. An image generation model performs a combination of diffusion time step sampling and noise rolling at each time step. In some examples, one or more diffusion time steps are sampled using a noise-based scheduling function. The sampling function samples dense time steps when it gets closer to obtaining a final synthetic image (i.e., as the noise decreases in a noise image at a time step). Additionally, the image generation model applies prompt augmentation (e.g., positive prompt, negative prompt) and sharpness classifier guidance at inference time, in addition to noise rolling and time step sampling. The sharpness classifier guidance can increase sharpness of the sampling process, and accordingly the overall aesthetics of synthetic patterns is increased. The synthetic image includes tileable patterns that are repeated seamlessly.

A method, apparatus, and non-transitory computer readable medium for image generation are described. One or more embodiments of the method, apparatus, and non-transitory computer readable medium include obtaining a noise input and an input prompt comprising a pattern element; shifting a coordinate frame of the noise input based on a diffusion step to obtain a shifted coordinate frame; and generating, using an image generation model, a synthetic image by denoising the noise input based on the input prompt and the shifted coordinate frame, wherein the synthetic image comprises a repetition of the pattern element.

A method, apparatus, and non-transitory computer readable medium for image generation are described. One or more embodiments of the method, apparatus, and non-transitory computer readable medium include obtain a noise input and an input prompt; sample a diffusion step using a noise-based scheduling function; shift a coordinate frame of the noise input based on the diffusion step to obtain a shifted coordinate frame; and generate, using an image generation model, a synthetic image by denoising the noise input based on the input prompt and the shifted coordinate frame.

An apparatus and method for image generation are described. One or more embodiments of the apparatus and method include at least one processor; at least one memory including instructions executable by the at least one processor; and an image generation model comprising parameters in the at least one memory and configured to sample a diffusion step using a noise-based scheduling function, shift a coordinate frame of a noise input based on the diffusion step to obtain a shifted coordinate frame, and generate a synthetic image by denoising the noise input based on an input prompt and the shifted coordinate frame, wherein the input prompt comprises a pattern element and the synthetic image comprises a repetition of the pattern element.

DETAILED DESCRIPTION

Figure 1:
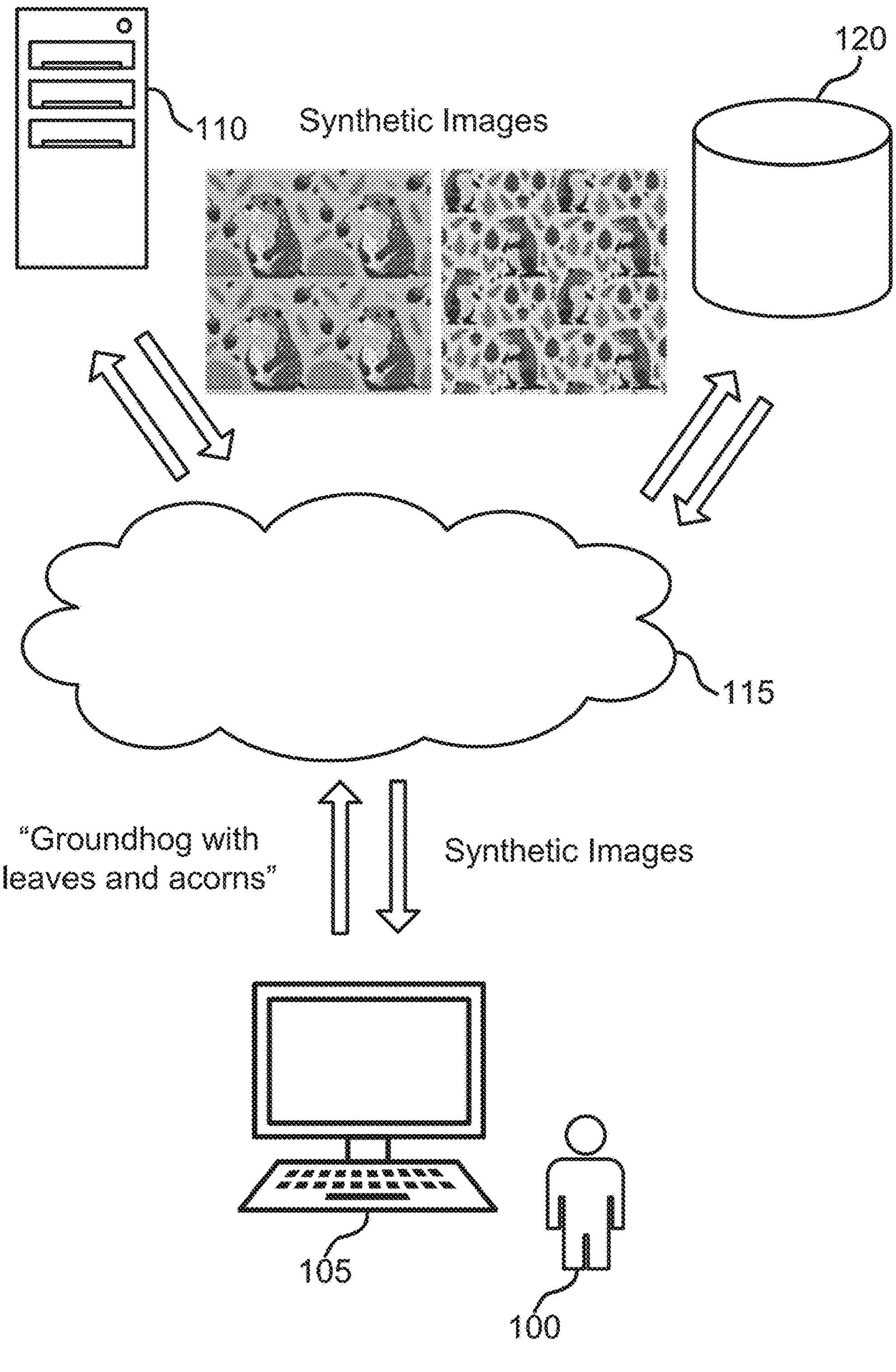
FIG. 1 shows an example of an image generation system according to aspects of the present disclosure.

The present disclosure describes systems and methods for pattern generation. Embodiments of the present disclosure include an image generation apparatus that receives an input prompt comprising a pattern element and generates a synthetic image including a repetition of a pattern element. An image generation model performs a combination of diffusion time step sampling and noise rolling at each time step. In some examples, one or more diffusion time steps are sampled using a noise-based scheduling function. The sampling function samples dense time steps when it gets closer to obtaining a final synthetic image (i.e., as the noise decreases in a noise image at a time step). Additionally, the image generation model applies prompt augmentation (e.g., positive prompt, negative prompt) and sharpness classifier guidance at inference time, in addition to noise rolling and time step sampling. The sharpness classifier guidance can increase sharpness of the sampling process, and accordingly the overall aesthetics of synthetic patterns is increased. The synthetic image includes tileable patterns that are repeated seamlessly.

Diffusion models are a class of generative neural networks that can be trained to generate new data with features similar to features found in training data. Diffusion models can be used in image synthesis, image completion tasks, etc. Conventional text-to-image generation models are not specifically trained for vector graphic pattern generation. Conventional models cannot guarantee the quality in terms of tileability, aesthetics, seamlessness, etc. Some existing models rely on specially trained prior models, but training these models separately increases computation cost.

Embodiments of the present disclosure include an image generation apparatus configured to take a noise input and an input prompt comprising a pattern element. The image generation apparatus generates, using an image generation model, a synthetic image based on the input prompt. The synthetic image includes a repetition of the pattern element (or a set of versions of the pattern element). In some examples, the image generation model includes a diffusion model which samples a diffusion time step using a noise-based scheduling function. In some cases, the predetermined scheduling function is based on a log signal-to-noise ratio (log SNR) function. The image generation model performs noise rolling on the noise input (e.g., a noise image) by shifting a coordinate frame of the noise input based on the diffusion time step to obtain a shifted coordinate frame. The synthetic image is generated by denoising the noise input based on the input prompt and the shifted coordinate frame.

In some embodiments, the image generation model iteratively obtains an updated noise input; samples an subsequent diffusion step based on a level of noise of the updated noise input; shifts the updated noise input based on the subsequent diffusion step to obtain an iterative shifted noise input; and removes noise from the iterative shifted noise input based on the input prompt to update the updated noise input. In some examples, the image generation model is configured to shift the updated noise input along a height dimension and a width dimension of the image based on the iterative diffusion time step to obtain an iterative shifted noise input.

In some cases, the image generation model predicts a shifted noise image based on a current sampled time step and a current noise image. In some cases, the image generation model unrolls the denoised noise input based on the diffusion time step to update the denoised noise input. Noise predicted by the diffusion model is removed from the iterative shifted noise input. The predicted noise is unrolled by a same amount as it was rolled.

In some embodiments, the image generation model obtains a preliminary prompt comprising a pattern element. The image generation model, using a prompt augmentation component, adds a pre-determined pattern term to the preliminary prompt to obtain an input prompt, i.e., adding a positive prompt that instructs the diffusion model what to do (e.g., "pattern of flower"). In some examples, a negative prompt is used concurrently to instruct the diffusion model what to avoid during generation. The negative prompt includes a pre-determined negative phrase. Furthermore, the image generation model computes or applies sharpness classifier guidance based on the noise input. A synthetic image is generated by denoising the noise input based on the input prompt (after prompt augmentation), the shifted coordinated frame, and the sharpness classifier guidance.

The present disclosure describes systems and methods that improve on conventional image generation models by providing more accurate and aesthetic repetition of patterns in synthetic images. For example, users can achieve visually appealing patterns having improved aesthetics, and obtain synthetic patterns that are tileable and repeated seamlessly (e.g., no artifacts near the edges between pattern elements). Embodiments of the present disclosure achieve improved text-to-pattern generation capacity through uniquely combining noise rolling and diffusion step sampling that involves a noise-based scheduling function. Specifically, the diffusion step is sampled based on a predetermined scheduling function that increases a sampling density as a level of noise of the noise input decreases. Accordingly, accuracy and aesthetics of generated patterns are improved.

Examples of application in text-to-pattern generation context are provided with reference to FIGS. 2-8. Details regarding the architecture of an example image generation system are provided with reference to FIGS. 1 and 10-14. Details regarding the image generation process are provided with reference to FIGS. 9 and 15.

Text-to-Pattern Generation

FIG. 1 shows an example of an image generation system according to aspects of the present disclosure. The example shown includes user 100, user device 105, image generation apparatus 110, cloud 115, and database 120. Image generation apparatus 110 is an example of, or includes aspects of, the corresponding element described with reference to FIG. 10.

In an example shown in FIG. 1, a preliminary prompt is provided by user 100 and transmitted to image generation apparatus 110, e.g., via user device 105 and cloud 115. The preliminary prompt includes a pattern element. For example, the preliminary prompt is "Groundhog with leaves and acorns". A pre-determined pattern term may be added to the preliminary prompt to obtain an input prompt. The input prompt is fed to image generation apparatus 110 via cloud 115.

Image generation apparatus 110 samples a diffusion step using a noise-based scheduling function, where the noise-based scheduling function increases a sampling density as a level of a noise of the noise input decreases. Image generation apparatus 110 performs noise rolling by shifting a coordinate frame of the noise input based on the diffusion step to obtain a shifted coordinate frame. In some cases, sharpness classifier guidance is applied on the noise input to obtain conditioned noise. Image generation apparatus 110 generates, using an image generation model, a synthetic image by denoising the noise input based on the input prompt, the shifted coordinate frame, the sharpness classifier guidance, and the conditioned noise. The synthetic image includes a repetition of the pattern element. Image generation apparatus 110 returns the synthetic image to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., an image generator, an image editing tool). In some examples, the image processing application on user device 105 may include functions of image generation apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image generation apparatus 110 includes a computer-implemented network comprising a prompt augmentation component, sharpness classifier, and a diffusion model. Image generation apparatus 110 may also include a processor unit, a memory unit, an I/O module, a user interface, and a training component. The training component is used to train an image generation model. Additionally, image generation apparatus 110 can communicate with database 120 via cloud 115. In some cases, the architecture of the text-to-pattern generation network is also referred to as a network, a machine learning model, or a network model. Further detail regarding the architecture of image generation apparatus 110 is provided with reference to FIGS. 10-14. Further detail regarding the operation of image generation apparatus 110 is provided with reference to FIGS. 2, 9, and 15.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., training dataset including text-image pairs) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
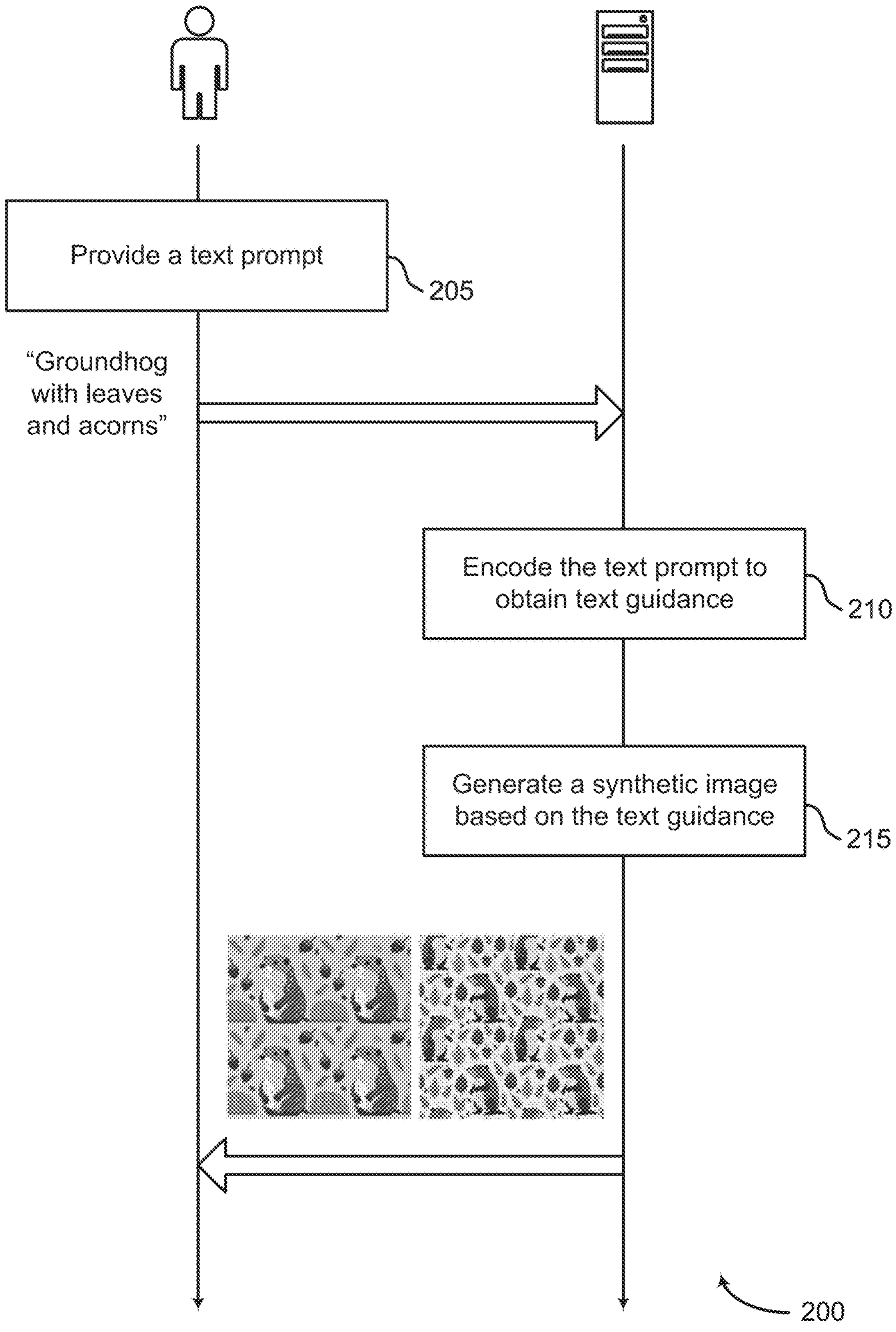
FIG. 2 shows an example of a method for conditional media generation according to aspects of the present disclosure.

FIG. 2 shows an example of a method 200 for conditional media generation according to aspects of the present disclosure. In some examples, method 200 describes an operation of image generation model 1025 described with reference to FIG. 10 such as an application of image generation apparatus 110 described with reference to FIG. 1. In some examples, these operations are performed by a system including a processor executing a set of codes to control functional elements of an apparatus such as the image generation apparatus described in FIG. 1.

Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, a user provides a text prompt. In some cases, the operations of this step refer to, or may be performed by, a user as described with reference to FIG. 1. In some cases, a user provides a text prompt describing content to be included in a generated media item. For example, the user may provide the prompt "Groundhog with leaves and acorns". In some examples, guidance can be provided in a form other than text, such as via an image, a sketch, or a layout.

At operation 210, the system encodes the text prompt to obtain text guidance. In some cases, the operations of this step refer to, or may be performed by, an image generation model as described with reference to FIGS. 10 and 11. In one or more embodiments, the system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

At operation 215, the system generates a synthetic image based on the text guidance. In some cases, the operations of this step refer to, or may be performed by, an image generation model as described with reference to FIGS. 10 and 11. In some embodiments, a noise map is initialized that includes random noise. The noise map may be in a pixel space or a latent space. By initializing a media item with random noise, different variations of a media item including the content described by the conditional guidance can be generated.

The system generates a media item (e.g., a synthetic image including a repetition of a pattern element) based on the noise map and the conditional guidance vector. For example, the synthetic image is generated using a reverse diffusion process as described with reference to FIG. 16.

Figure 3:
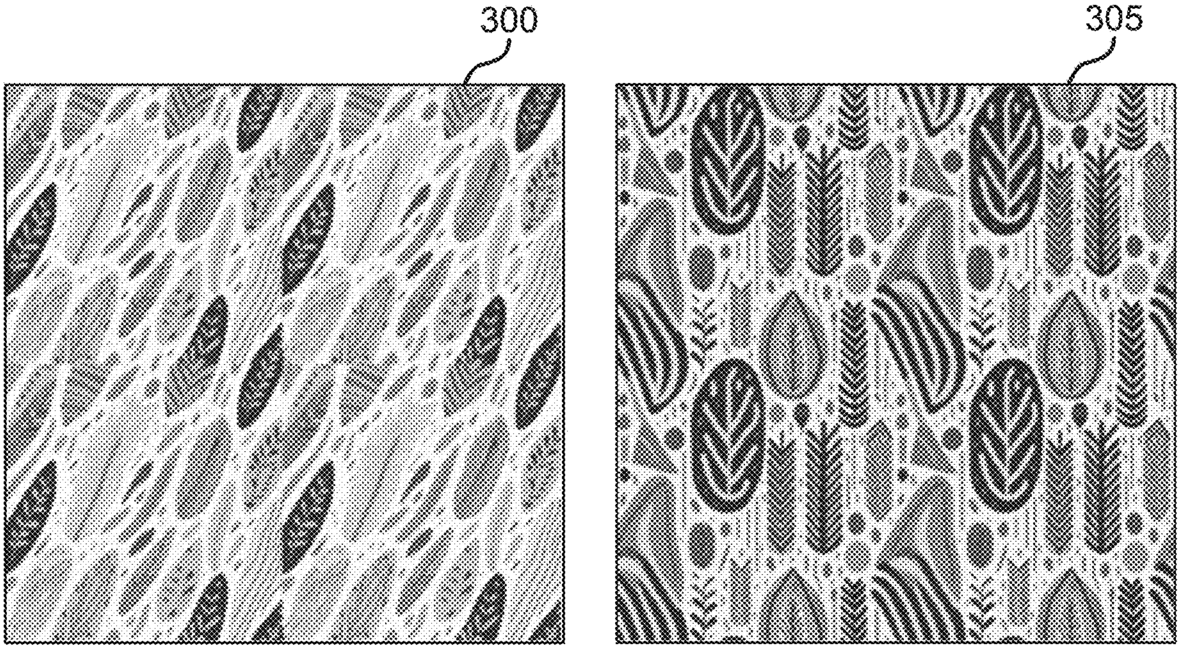
FIG. 3 shows an example of noise rolling effect according to aspects of the present disclosure.

FIG. 3 shows an example of noise rolling effect according to aspects of the present disclosure. The example shown includes first synthetic image 300 and second synthetic image 305. For example, first synthetic image 300 is generated, using image generation model 1025 (with reference to FIG. 10), without noise rolling. Second synthetic image 305 is generated, using image generation model 1025, with noise rolling. In some cases, implementation of noise rolling enables the generation of seamless and tileable patterns and removes discontinuities across patterns in synthetic images.

Second synthetic image 305 (generated with noise rolling) shows a higher degree of detail and tileability compared to first synthetic image 300 (without noise rolling).

Figure 4:
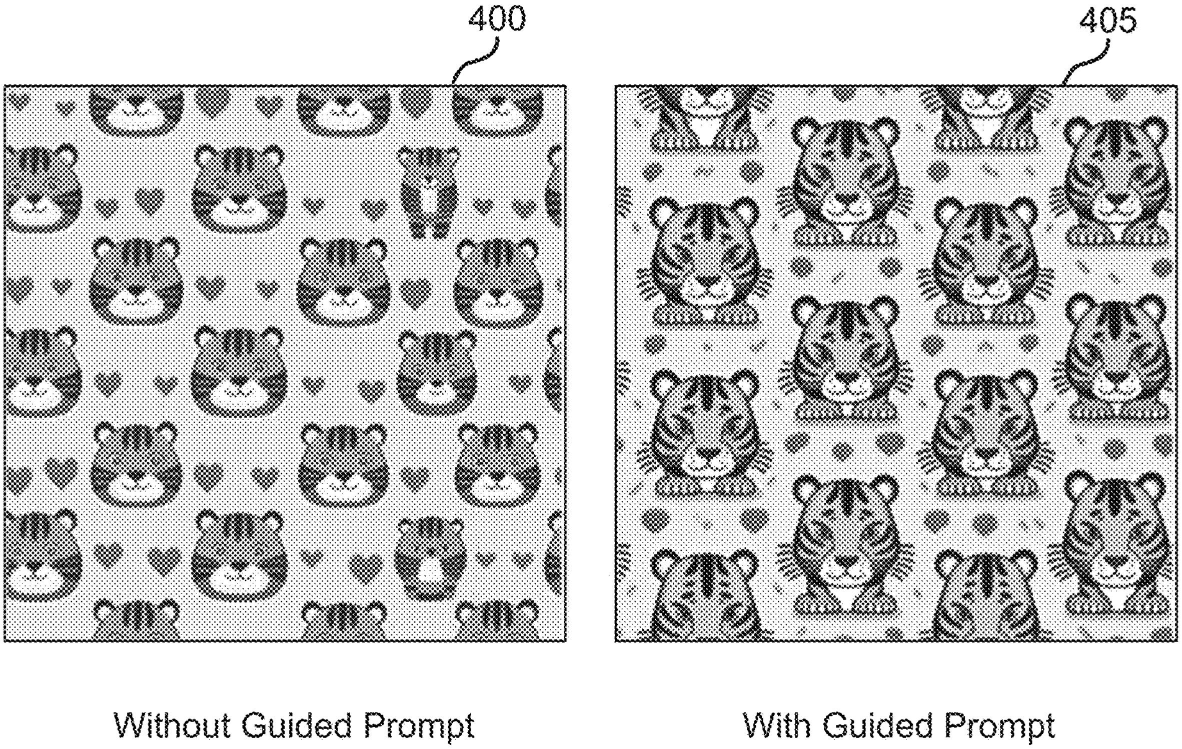
FIGS. 4 and 5 show examples of prompt augmentation effect according to aspects of the present disclosure.

FIG. 4 shows an example of prompt augmentation effect according to aspects of the present disclosure. The example shown includes third synthetic image 400 and fourth synthetic image 405. For example, third synthetic image 400 is generated, using image generation model 1025 (with reference to FIG. 10), without guided prompts. Fourth synthetic image 405 is generated, using image generation model 1025, based in part on a guided prompt.

Prompt engineering (e.g., prompt augmentation) is used to condition a diffusion model and accordingly the relevance and quality of synthetic images are increased. By incorporating positive prompts (e.g., words or phrases that indicate or include "clean" and "systematic") after a preliminary input prompt, image generation model 1025 with reference to FIG. 10 generates synthetic patterns that are more organized and cleaner. In the above example, fourth synthetic image 405 (generated with a guided prompt) include patterns that are relatively more organized and cleaner compared to patterns in third synthetic image 400 (generated without a guided prompt).

Figure 5:
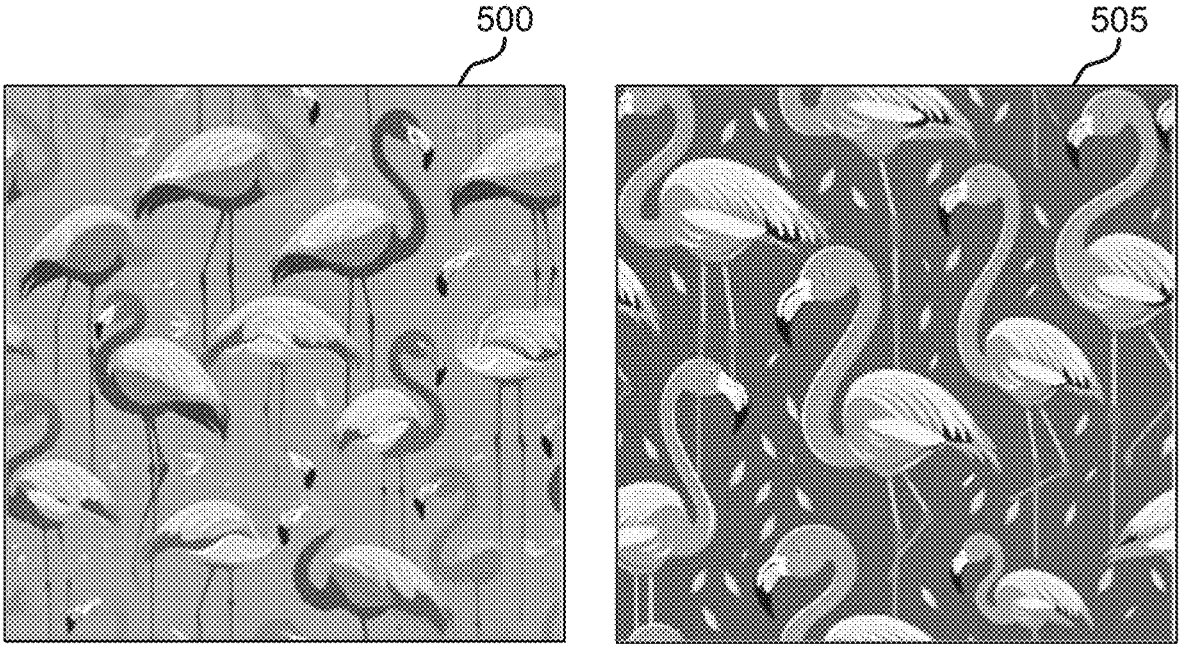

FIG. 5 shows an example of prompt augmentation effect according to aspects of the present disclosure. The example shown includes fifth synthetic image 500 and sixth synthetic image 505. Fifth synthetic image 500 is generated, using image generation model 1025 (with reference to FIG. 10), without inclusion of specific anchor prompts. Sixth synthetic image 505 is generated, using image generation model 1025, based in part on an anchor prompt.

In some examples, negative prompts (or anchor prompts) are used in text-to-pattern generation. An anchor prompt is used to guide image generation model 1025 to avoid generating unwanted elements in synthetic images. Inclusion of anchor prompts can remove artifacts, cluttered, distorted, dull, entangled characteristics from synthetic images. This way, users have increased control over the model output. In the above example, sixth synthetic image 505 (generated with an anchor prompt) includes fewer to no artifacts and is not cluttered or distorted compared to fifth synthetic image 500 (generated without anchor prompts).

Figure 6:
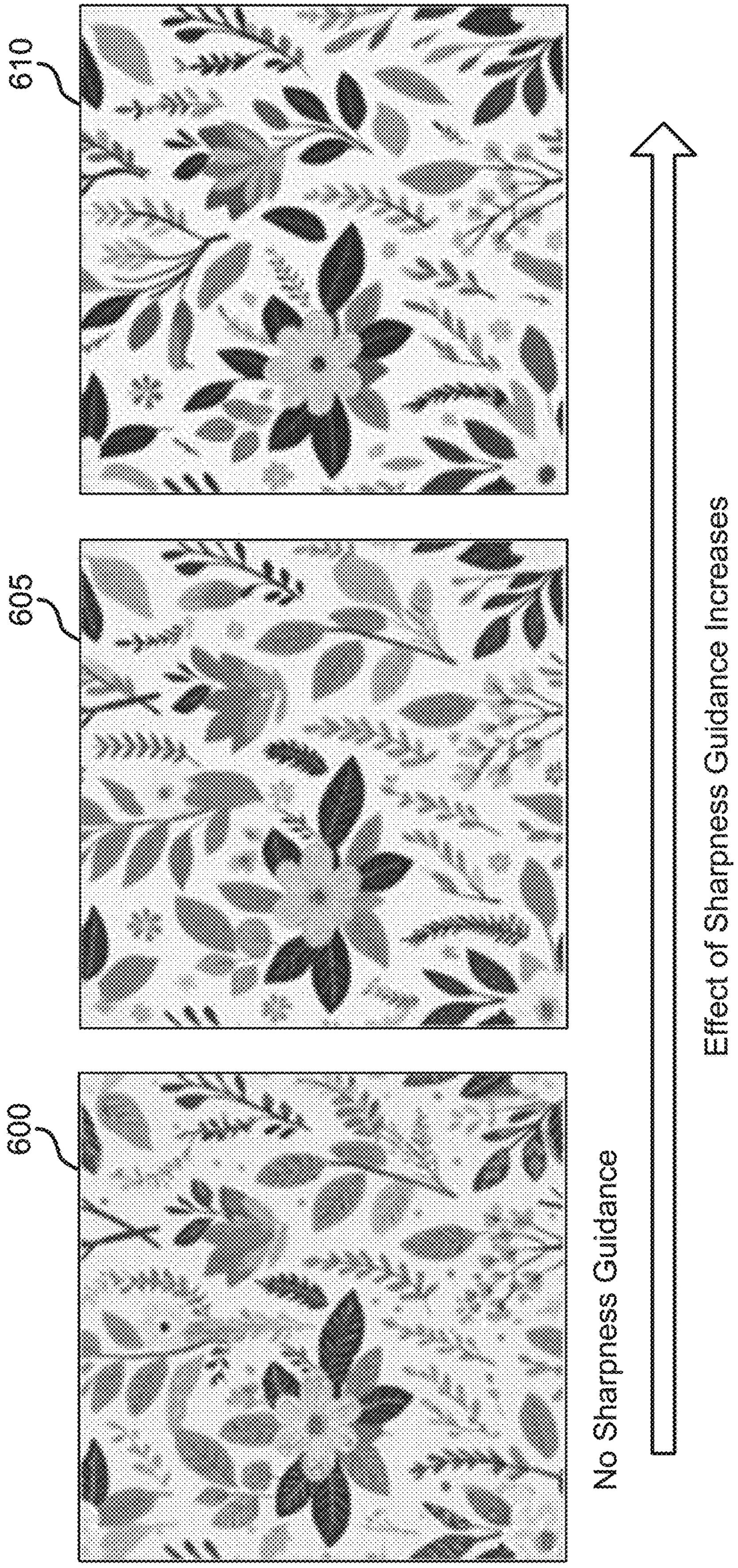
FIG. 6 shows an example of sharpness classifier guidance according to aspects of the present disclosure.

FIG. 6 shows an example of sharpness classifier guidance according to aspects of the present disclosure. The example shown includes seventh synthetic image 600, eighth synthetic image 605, and ninth synthetic image 610. Sharpness classifier guidance is applied to increase the sharpness of the sampling process. Sharpness classifier guidance is used to make images look crisper and show more defined edges, and hence improving the overall visual appeal of the generated patterns. Furthermore, sharpness classifier guidance is applied to remove small artifacts that can detract from the quality of the image. At the same time, sharpness classifier guidance increases color integrity and ensures that the generated patterns have vibrant and appealing color schemes. In an example shown in FIG. 6, seventh synthetic image 600, eighth synthetic image 605, and ninth synthetic image 610 represent the effect of sharpness classifier guidance on pattern generation. No sharpness classifier guidance is applied when an image generation model generates seventh synthetic image 600. The effect of sharpness classifier guidance increases when the image generation model generates eighth synthetic image 605 and ninth synthetic image 610, respectively.

Figure 7:
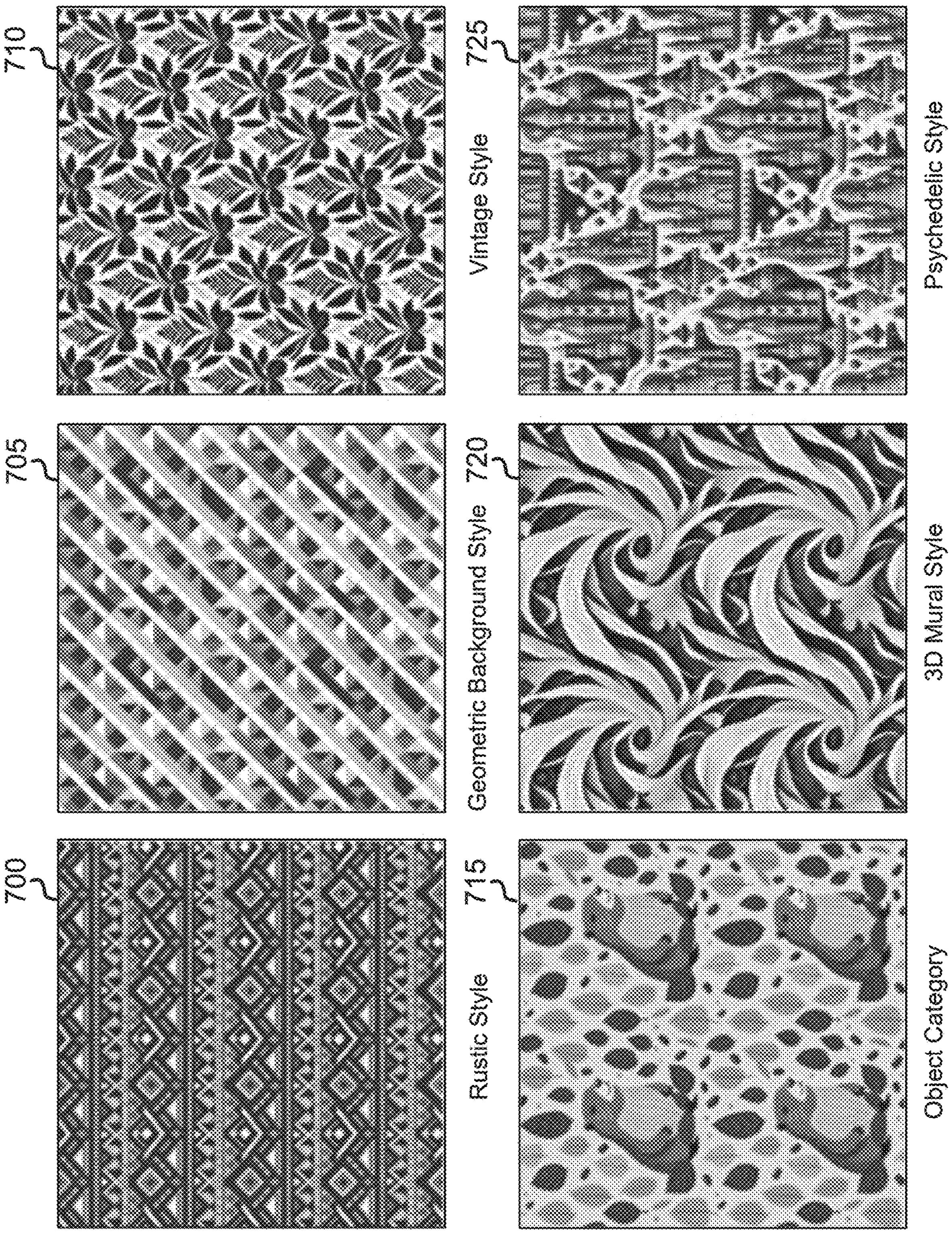
FIGS. 7 and 8 show examples of synthetic images including patterns according to aspects of the present disclosure.

FIG. 7 shows an example of synthetic images including patterns according to aspects of the present disclosure. The example shown includes first synthetic image 700, second synthetic image 705, third synthetic image 710, fourth synthetic image 715, fifth synthetic image 720, and sixth synthetic image 725. The six synthetic images shown in FIG. 7 represents 2×2 tiled pattern. The six synthetic images are examples of synthetic images generated across different themes using an image generation model. FIG. 7 demonstrates that the image generation model can generate aesthetically pleasing and seamless patterns across a diverse range of styles and categories. In some examples, first synthetic image 700, second synthetic image 705, third synthetic image 710, fourth synthetic image 715, fifth synthetic image 720, and sixth synthetic image 725 correspond to rustic style, geometric background style, vintage style, object category, 3-dimensional (3D) mural style, and psychedelic style, respectively.

Figure 8:
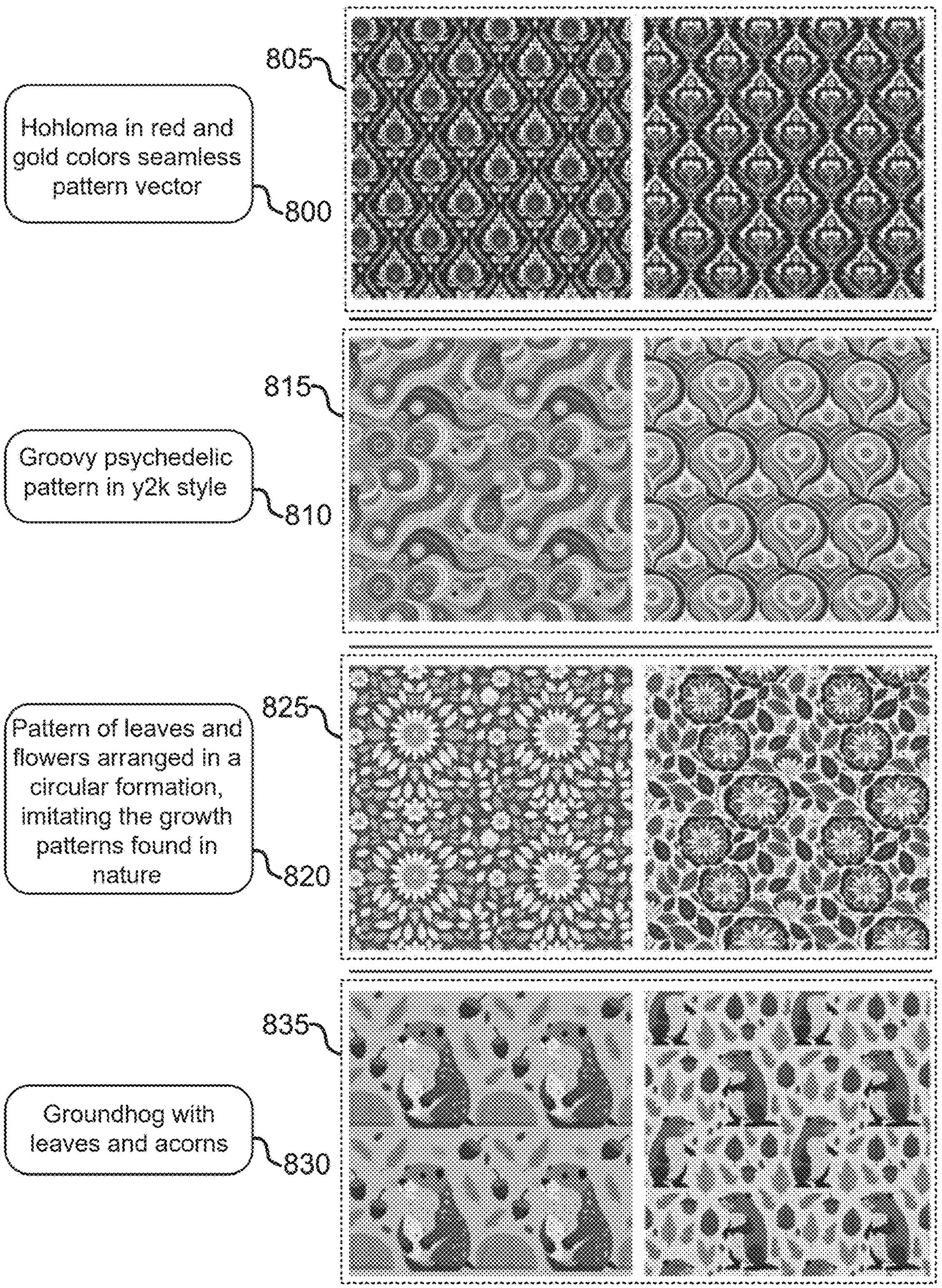

FIG. 8 shows an example of synthetic images including patterns according to aspects of the present disclosure. The example shown includes a first input prompt 800, a first set of synthetic images 805, a second input prompt 810, a second set of synthetic images 815, a third input prompt 820, a third set of synthetic images 825, a fourth input prompt 830, and a fourth set of synthetic images 835. FIG. 8 shows examples of synthetic images generated based on input prompts using image generation model 1025 (with reference to FIG. 10). Examples (and qualitative comparison) demonstrate that the image generation model described in embodiments of the present disclosure outperforms conventional systems across various patterns given input prompts (e.g., captions). In some examples, image generation model 1025 generates a first set of synthetic images 805 based on a first input prompt 800 ("Hohloma in red and gold colors seamless pattern vector"). The image generation model 1025 generates a second set of synthetic images 815 based on a second input prompt 810 ("Groovy psychedelic pattern in y2k style"). The image generation model 1025 generates a third set of synthetic images 825 based on a third input prompt 820 ("Pattern of leaves and flowers arranged in a circular formation, imitating the growth patterns found in nature"). The image generation model 1025 generates a fourth set of synthetic images 835 based on a fourth input prompt 830 ("Groundhog with leaves and acorns").

Figure 9:
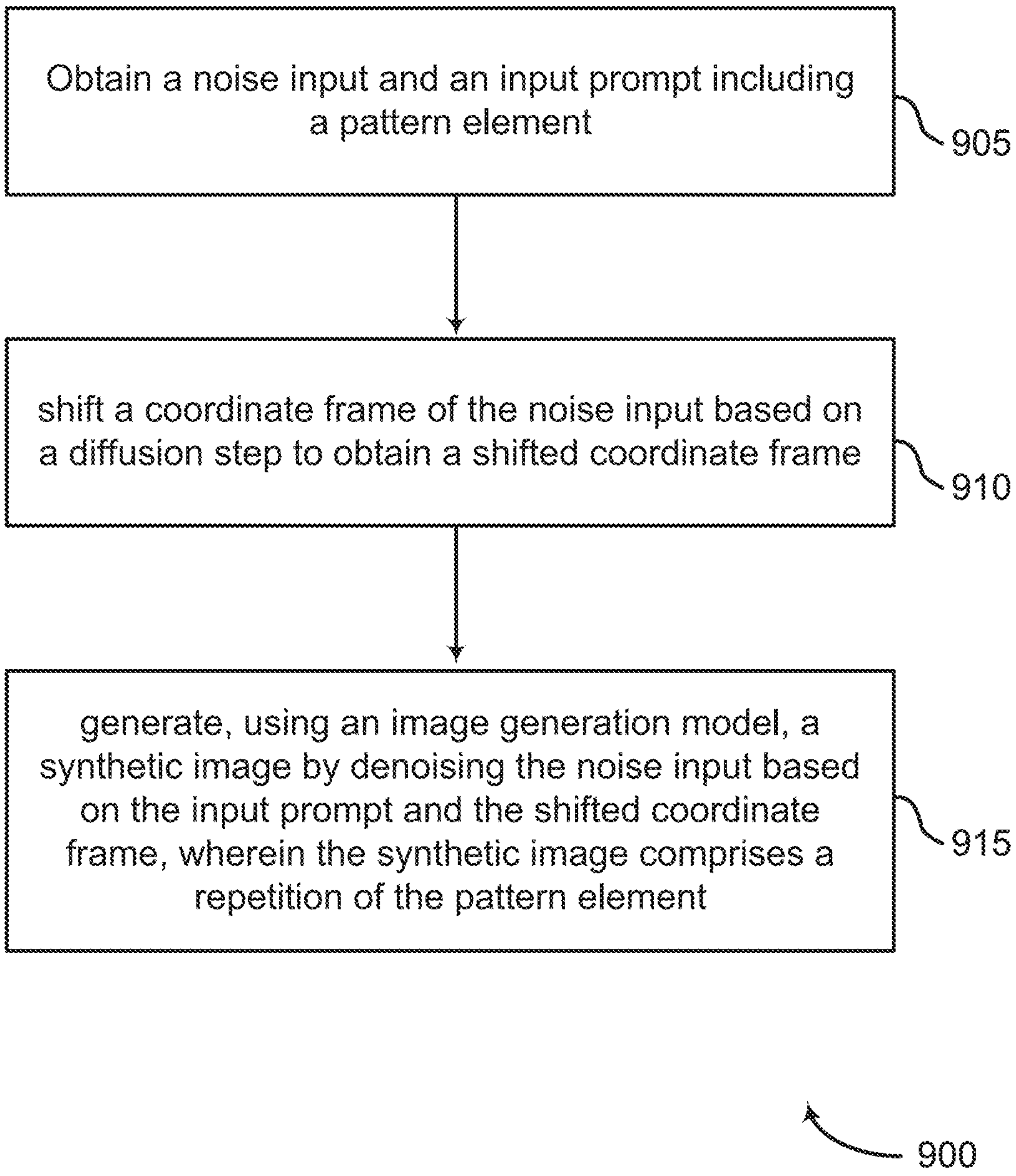
FIG. 9 shows an example of a method for image generation according to aspects of the present disclosure.

FIG. 9 shows an example of a method 900 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a noise input and an input prompt including a pattern element. In some cases, the operations of this step refer to, or may be performed by, an image generation model as described with reference to FIGS. 10 and 11. In some cases, a user provides a text prompt describing content to be included in a generated media item. For example, the user may provide the prompt "Groundhog with leaves and acorns".

At operation 910, the system shifts a coordinate frame of the noise input based on a diffusion step to obtain a shifted coordinate frame. In some cases, the operations of this step refer to, or may be performed by, an image generation model as described with reference to FIGS. 10 and 11.

Some embodiments of the present disclosure sample a diffusion step using a noise-based scheduling function. In some cases, the operation of sampling the diffusion step refer to, or may be performed by, an image generation model as described with reference to FIGS. 10 and 11.

The text-guided image generation process is influenced by the noise scheduling functions in diffusion (denoising) models. The image generation model applies a noise-based scheduling function, e.g., log signal-to-noise ratio (log SNR) function for time-step sampling during inference. Different from a uniform noise scheduling function, the log SNR noise scheduling function is applied to a U-Net during inference time. The log SNR scheduling function samples dense time steps when the model gets close to generating the final image. This ensures that no seam can appear towards the end of the diffusion denoising process. The image generation model reduces or eliminates seams among generated patterns in synthetic images. The image generation model generates synthetic images that include clean and seamless patterns. Accordingly, the overall quality and aesthetics of the patterns are increased.

Embodiments of the present disclosure are not limited to using log SNR noise scheduling function. A scheduling function with a dense sampling step close to the original image (i.e., close to time step 0) can be used. For example, predefined noise scheduling function can be a linear scheduler but samples more densely close to time step 0, e.g., [901, 801, . . . , 101, 10, 8, 6, 4, 2, 1], etc.

Some embodiments of the present disclosure perform noise rolling during diffusion denoising steps to facilitate seamless image generation. Image generation model 1025 (with reference to FIG. 10) systematically adjusts a noise tensor by rolling it along a width dimension and a height dimension. The adjusted noise tensor is then input to a diffusion model (e.g., diffusion model 1040 described in FIG. 10). The predicted noise from the image generation model is subsequently unrolled by the same amount. The process of rolling and unrolling is performed at each inference time step, with the degree of rolling varying between time steps. The image generation model generates tileable, seamless patterns and improves the quality of synthetic images. The synthetic images (see FIG. 3) show a higher degree of detail and tileability. Furthermore, the image generation model does not depend on an additional prior model. The image generation model is more effective and efficient.

In some examples, the image generation model uses deterministic noise rolling. Shifting the coordinate frame comprises obtaining a roll value based on the diffusion step. The coordinate frame is shifted by the roll value. A "roll value" refers to the amount of rolling at each iteration step. It is controlled by max roll and roll scale amount.

In some examples, the image generation model identifies a roll stride value, where the roll value is obtained based on the roll stride value. Roll Stride refers to a pre-determined value representing the interval between each noise rolling operation (e.g. stride=5).

In some examples, the image generation model identifies a roll scale. "Roll scale" refers to a tuple specifying the maximum amount by which to roll the tensor along the height dimension and width dimension, e.g., (0.25,0.25). If the width of tensor is 128, the max roll would be 128×0.25. In some examples, "iteration index" refers to a number representing the index of a particular time step in sequence of time steps during denoising step of the diffusion model.

At operation 915, the system generates, using an image generation model, a synthetic image by denoising the noise input based on the input prompt and the shifted coordinate frame, where the synthetic image includes a repetition of the pattern element. In some cases, the operations of this step refer to, or may be performed by, an image generation model as described with reference to FIGS. 10 and 11.

In some cases, the synthetic image includes a tileable image (or a seamless image) comprising a pattern element that is repeated multiple times in any direction without showing visible seams or edges where the image is repeated. In some examples, edges of the repeated pattern element in the synthetic image match up perfectly when repeated, creating a seamless pattern.

In FIGS. 1-9, a method, apparatus, and non-transitory computer readable medium for image generation are described. One or more embodiments of the method, apparatus, and non-transitory computer readable medium include obtaining a noise input and an input prompt comprising a pattern element; sampling a diffusion step using a noise-based scheduling function; shifting a coordinate frame of the noise input based on the diffusion step to obtain a shifted coordinate frame; and generating, using an image generation model, a synthetic image by denoising the noise input based on the input prompt and the shifted coordinate frame, wherein the synthetic image comprises a repetition of the pattern element.

Some examples of the method, apparatus, and non-transitory computer readable medium further include iteratively obtaining an updated noise input, sampling an subsequent diffusion step based on a level of noise of the updated noise input, shifting the updated noise input based on the subsequent diffusion step to obtain an iterative shifted noise input, and removing noise from the iterative shifted noise input based on the input prompt to update the updated noise input.

Some examples of the method, apparatus, and non-transitory computer readable medium further include unrolling the denoised noise input based on the diffusion step to update the denoised noise input, wherein the synthetic image is generated based on the unrolling.

In some examples, the diffusion step is sampled based on a scheduling function that increases a sampling density as a level of noise of the noise input decreases. In some examples, the scheduling function is based on a log signal-to-noise ratio (log SNR) function.

Some examples of the method, apparatus, and non-transitory computer readable medium further include obtaining a roll value based on the diffusion step, wherein the coordinate frame is shifted by the roll value.

Some examples of the method, apparatus, and non-transitory computer readable medium further include identifying a roll stride value, wherein the roll value is obtained based on the roll stride value.

Some examples of the method, apparatus, and non-transitory computer readable medium further include shifting a horizontal coordinate and a vertical coordinate of the coordinate frame. Some examples of the method, apparatus, and non-transitory computer readable medium further include equating opposite edges of the noise input.

Some examples of the method, apparatus, and non-transitory computer readable medium further include obtaining a preliminary prompt. Some examples further include adding a pre-determined pattern term to the preliminary prompt to obtain the input prompt.

Some examples of the method, apparatus, and non-transitory computer readable medium further include obtaining a negative prompt, wherein the synthetic image is generated based on the negative prompt.

Some examples of the method, apparatus, and non-transitory computer readable medium further include applying sharpness classifier guidance on the noise input to obtain conditioned noise, wherein the synthetic image is generated based on the sharpness classifier guidance and the conditioned noise. Some examples of the method, apparatus, and non-transitory computer readable medium further include vectorizing the synthetic image to obtain a vector image.

Network Architecture

Figure 10:
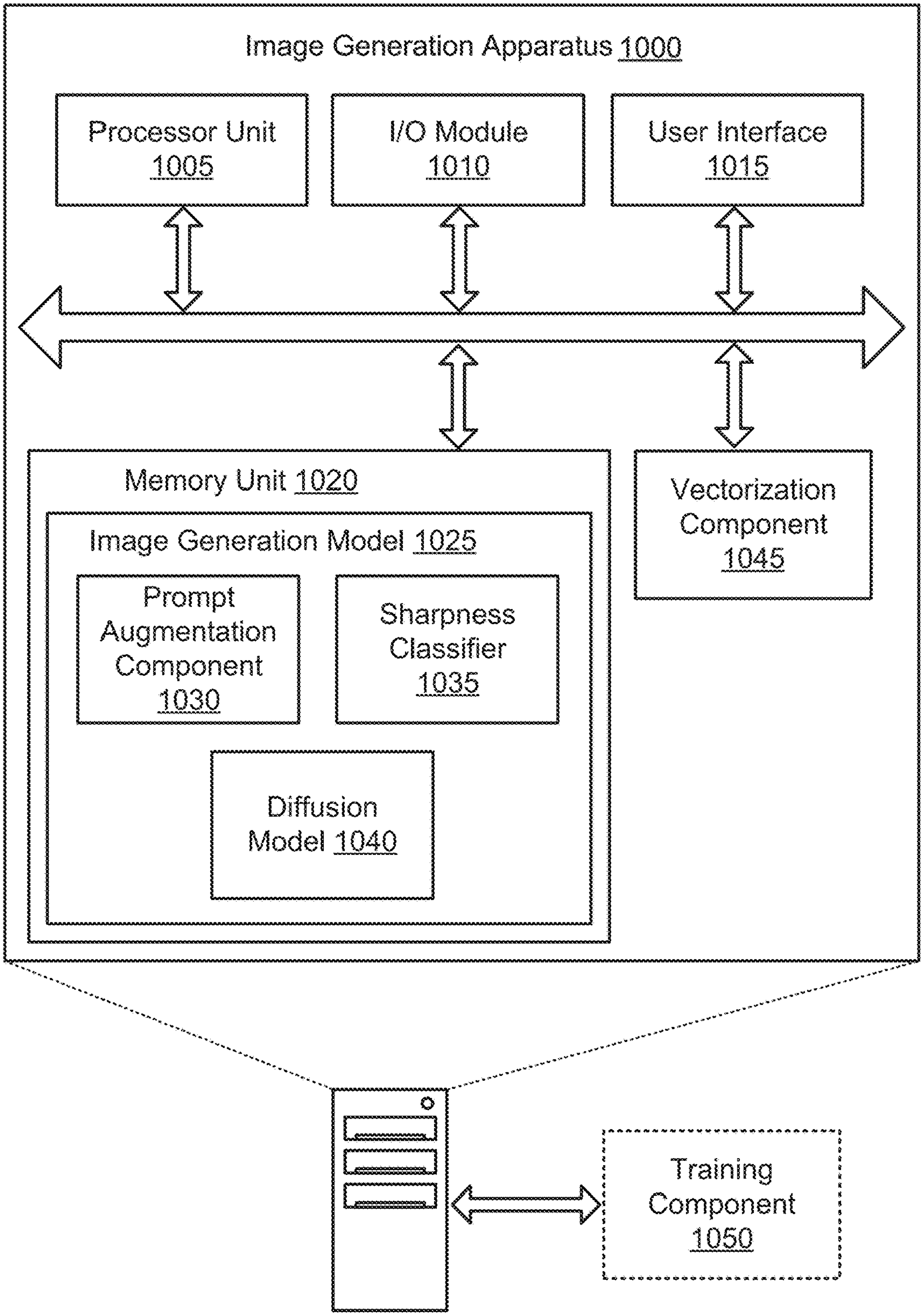
FIG. 10 shows an example of an image generation apparatus according to aspects of the present disclosure.

FIG. 10 shows an example of an image generation apparatus 1000 according to aspects of the present disclosure. The example shown includes image generation apparatus 1000, processor unit 1005, I/O module 1010, user interface 1015, memory unit 1020, image generation model 1025, vectorization component 1045, and training component 1050. Image generation apparatus 1000 is an example of, or includes aspects of, the corresponding element described with reference to FIG. 1.

Processor unit 1005 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, processor unit 1005 is configured to operate a memory array using a memory controller. In other cases, a memory controller is integrated into the processor. In some cases, processor unit 1005 is configured to execute computer-readable instructions stored in a memory to perform various functions. In some embodiments, processor unit 1005 includes special purpose components for modem processing, baseband processing, digital signal processing, or transmission processing.

Examples of memory unit 1020 include random access memory (RAM), read-only memory (ROM), or a hard disk. Examples of memory unit 1020 include solid state memory and a hard disk drive. In some examples, memory unit 1020 is used to store computer-readable, computer-executable software including instructions that, when executed, cause a processor to perform various functions described herein. In some cases, memory unit 1020 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 1020 store information in the form of a logical state.

In one embodiment, image generation model 1025 includes prompt augmentation component 1030, sharpness classifier 1035, and diffusion model 1040. In some examples, at least one memory unit 1020 includes instructions executable by the at least one processor unit 1005. Memory unit 1020 includes image generation model 1025 or stores parameters of image generation model 1025. Additionally or alternatively, memory unit 1020 includes diffusion model 1040 or stores parameters of diffusion model 1040.

I/O module 1010 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 1010 includes a user interface 1015. A user interface 1015 may enable a user to interact with a device. In some embodiments, the user interface 1015 may include an audio device, such as an external speaker system, an external display device such as a display screen, or an input device (e.g., remote control device interfaced with the user interface 1015 directly or through an I/O controller module). In some cases, a user interface 1015 may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 1000 includes a computer implemented artificial neural network (ANN) for text-to pattern generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the image generation model 1025 (e.g., a diffusion model) are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image generation apparatus 1000 includes a convolutional neural network (CNN) for text-to-pattern generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, image generation model 1025 obtains a noise input and an input prompt including a pattern element. In some examples, image generation model 1025 samples a diffusion step using a noise-based scheduling function. Image generation model 1025 shifts a coordinate frame of the noise input based on the diffusion step to obtain a shifted coordinate frame. Image generation model 1025 generates a synthetic image by denoising the noise input based on the input prompt and the shifted coordinate frame, where the synthetic image includes a repetition of the pattern element.

In some examples, image generation model 1025 iteratively obtains an updated noise input, sampling an subsequent diffusion step based on a level of noise of the updated noise input, shifting the updated noise input based on the subsequent diffusion step to obtain an iterative shifted noise input, and removing noise from the iterative shifted noise input based on the input prompt to update the updated noise input.

In some examples, image generation model 1025 unrolls the denoised noise input based on the diffusion step to update the denoised noise input, where the synthetic image is generated based on the unrolling. In some examples, the diffusion step is sampled based on a scheduling function that increases a sampling density as a level of noise of the noise input decreases. In some aspects, the scheduling function is based on a log signal-to-noise ratio (log SNR) function. In some examples, image generation model 1025 obtains a roll value based on the diffusion step, where the coordinate frame is shifted by the roll value. In some examples, image generation model 1025 identifies a roll stride value, where the roll value is obtained based on the roll stride value. In some examples, image generation model 1025 shifts a horizontal coordinate and a vertical coordinate of the coordinate frame. In some examples, image generation model 1025 equates opposite edges of the noise input.

In some examples, image generation model 1025 obtains a negative prompt, where the synthetic image is generated based on the negative prompt.

According to some aspects, image generation model 1025 obtains a noise input and a preliminary prompt including a pattern element. In some examples, image generation model 1025 samples a diffusion step using a noise-based scheduling function, where the noise-based scheduling function increases a sampling density as a level of a noise of the noise input decreases. Image generation model 1025 shifts a coordinate frame of the noise input based on the diffusion step to obtain a shifted coordinate frame. Image generation model 1025 generates a synthetic image by denoising the noise input based on the input prompt, the shifted coordinate frame, the sharpness classifier guidance, and the conditioned noise, where the synthetic image includes a repetition of the pattern element.

In some examples, image generation model 1025 iteratively obtains an updated noise input, sampling an subsequent diffusion step based on a level of noise of the updated noise input, shifting the updated noise input based on the subsequent diffusion step to obtain an iterative shifted noise input, generating iterative sharpness classifier guidance based on the shifted updated noise input, and removing noise from the iterative shifted noise input based on the input prompt and the iterative sharpness classifier guidance to update the updated noise input.

According to some embodiments, image generation model 1025 (comprising parameters in the at least one memory) is configured to sample a diffusion step using a noise-based scheduling function, shift a coordinate frame of a noise input based on the diffusion step to obtain a shifted coordinate frame, and generate a synthetic image by denoising the noise input based on an input prompt and the shifted coordinate frame, wherein the input prompt comprises a pattern element and the synthetic image comprises a repetition of the pattern element.

In some examples, the image generation model 1025 includes a diffusion model 1040. In some examples, the image generation model 1025 includes a sharpness classifier 1035 configured to apply sharpness classifier guidance on the noise input. In some aspects, the image generation model 1025 includes a prompt augmentation component 1030 configured to add a pre-determined pattern term to a preliminary prompt to obtain the input prompt. Image generation model 1025 is an example of, or includes aspects of, the corresponding element described with reference to FIG. 11.

According to some embodiments, prompt augmentation component 1030 obtains a preliminary prompt. In some examples, prompt augmentation component 1030 adds a pre-determined pattern term to the preliminary prompt to obtain the input prompt. Prompt augmentation component 1030 is an example of, or includes aspects of, the corresponding element described with reference to FIG. 11.

According to some embodiments, sharpness classifier 1035 applies sharpness classifier guidance on the noise input to obtain conditioned noise, where the synthetic image is generated based on the sharpness classifier guidance and the conditioned noise. Sharpness classifier 1035 is an example of, or includes aspects of, the corresponding element described with reference to FIG. 11.

Figure 11:
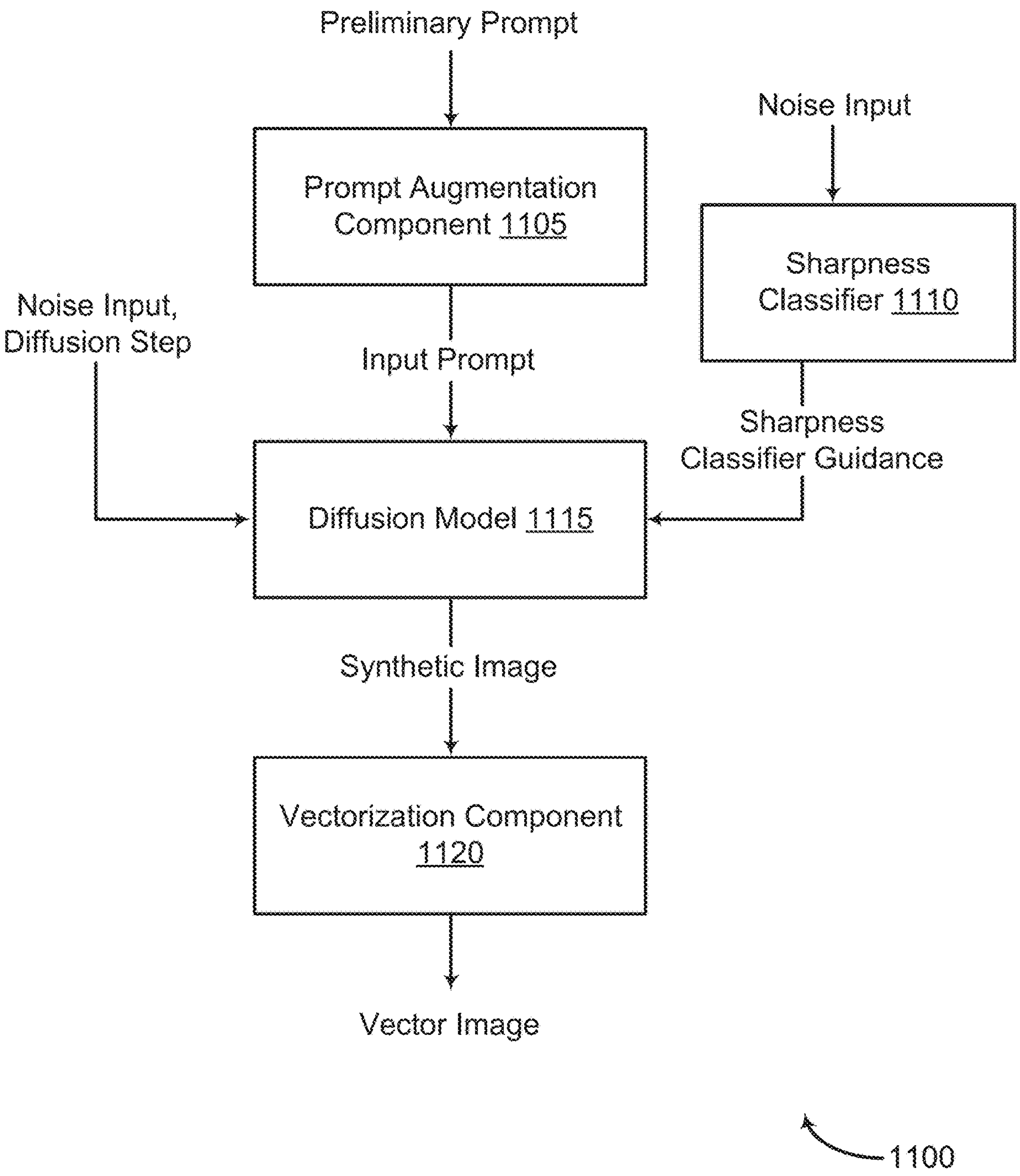
FIG. 11 shows an example of an image generation model according to aspects of the present disclosure.
Figure 12:
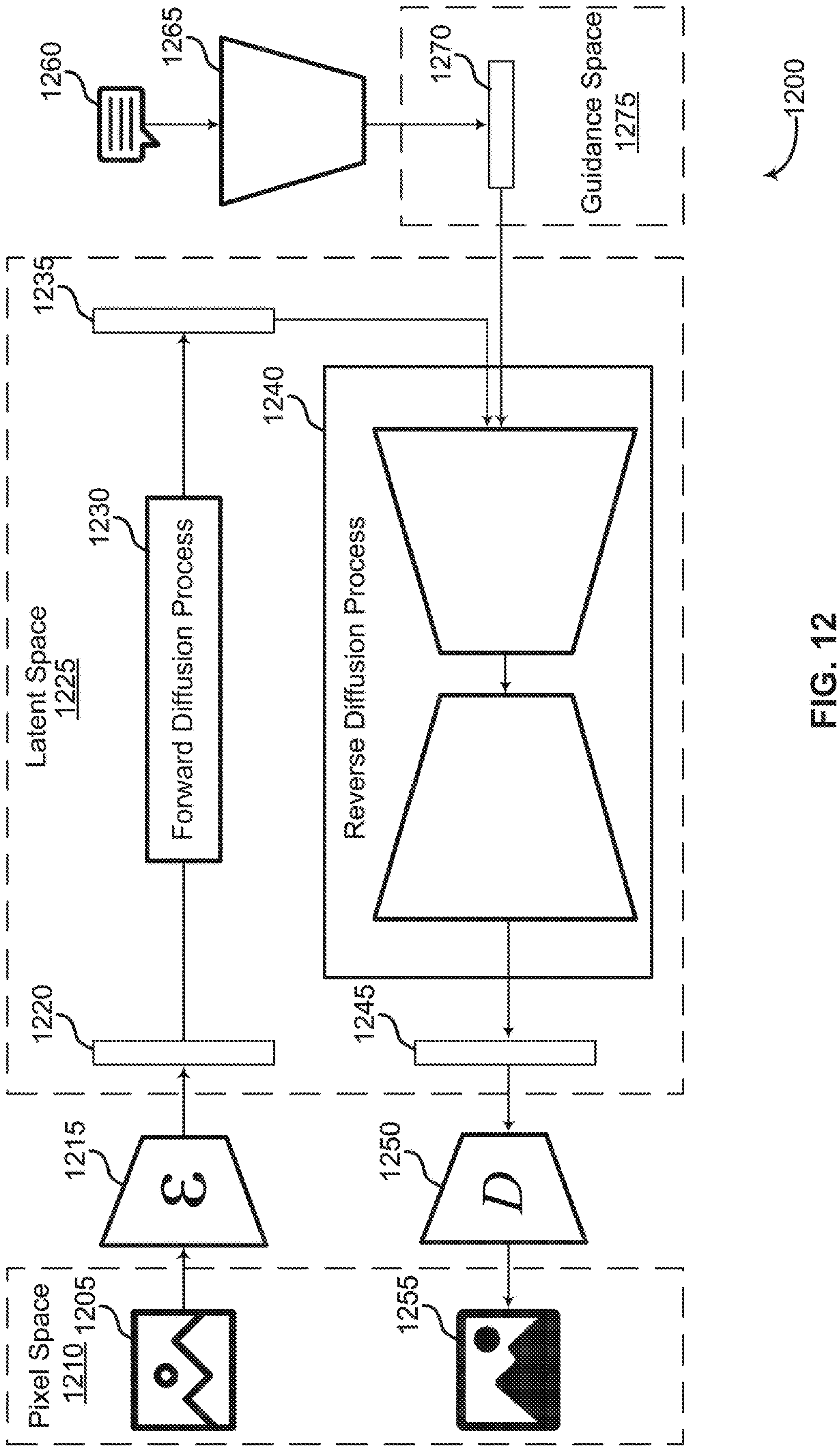
FIG. 12 shows an example of a guided latent diffusion model according to aspects of the present disclosure.

In some examples, diffusion model 1040 includes a guided latent diffusion model as described in FIG. 12. Diffusion model 1040 is an example of, or includes aspects of, the corresponding element described with reference to FIG. 11. According to some aspects, vectorization component 1045 vectorizes the synthetic image to obtain a vector image. Vectorization component 1045 is an example of, or includes aspects of, the corresponding element described with reference to FIG. 11.

FIG. 11 shows an example of an image generation model 1100 according to aspects of the present disclosure. The example shown includes image generation model 1100, prompt augmentation component 1105, sharpness classifier 1110, diffusion model 1115, and vectorization component 1120. Image generation model 1100 is an example of, or includes aspects of, the corresponding element described with reference to FIG. 10.

Prompt augmentation component 1105 obtains a preliminary prompt. Prompt augmentation component 1105 adds a pre-determined pattern term to the preliminary prompt to obtain the input prompt. Prompt augmentation component 1105 is an example of, or includes aspects of, the corresponding element described with reference to FIG. 10.

Diffusion model 1115 obtains a noise input and an input prompt comprising a pattern element. Diffusion model 1115 samples a diffusion step using a noise-based scheduling function. Diffusion model 1115 shifts a coordinate frame of the noise input based on the diffusion step to obtain a shifted coordinate frame. Diffusion model 1115 generates a synthetic image by denoising the noise input based on the input prompt and the shifted coordinate frame. The synthetic image comprises a repetition of the pattern element. Diffusion model 1115 is an example of, or includes aspects of, the corresponding element described with reference to FIG. 10.

In some embodiments, diffusion model 1115 obtains a noise input and an input prompt comprising a pattern element. Diffusion model 1115 samples a diffusion time step based on predefined noise scheduling function. Diffusion model 1115 predicts a shifted noise image based on the current sampled time step and current noise image.

Sharpness classifier guidance is applied, via sharpness classifier 1110, on the noise input to obtain conditioned noise. Sharpness classifier 1110 is an example of, or includes aspects of, the corresponding element described with reference to FIG. 10.

Vectorization component 1120 vectorizes the synthetic image to obtain a vector image. Vectorization component 1120 is an example of, or includes aspects of, the corresponding element described with reference to FIG. 10.

FIG. 12 shows an example of a guided latent diffusion model 1200 according to aspects of the present disclosure. The guided latent diffusion model 1200 depicted in FIG. 12 is an example of, or includes aspects of, the corresponding element (i.e., diffusion model 1040) described with reference to FIG. 10.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1200 may take an original image 1205 in a pixel space 1210 as input and apply and image encoder 1215 to convert original image 1205 into original image features 1220 in a latent space 1225. Then, a forward diffusion process 1230 gradually adds noise to the original image features 1220 to obtain noisy features 1235 (also in latent space 1225) at various noise levels.

Next, a reverse diffusion process 1240 (e.g., a U-Net ANN) gradually removes the noise from the noisy features 1235 at the various noise levels to obtain denoised image features 1245 in latent space 1225. In some examples, the denoised image features 1245 are compared to the original image features 1220 at each of the various noise levels, and parameters of the reverse diffusion process 1240 of the diffusion model are updated based on the comparison. Finally, an image decoder 1250 decodes the denoised image features 1245 to obtain an output image 1255 in pixel space 1210. In some cases, an output image 1255 is created at each of the various noise levels. The output image 1255 can be compared to the original image 1205 to train the reverse diffusion process 1240.

In some cases, image encoder 1215 and image decoder 1250 are pre-trained prior to training the reverse diffusion process 1240. In some examples, they are trained jointly, or the image encoder 1215 and image decoder 1250 and fine-tuned jointly with the reverse diffusion process 1240.

The reverse diffusion process 1240 can also be guided based on a text prompt 1260, or another guidance prompt, such as an image, a layout, a segmentation map, etc. The text prompt 1260 can be encoded using a text encoder 1265 (e.g., a multimodal encoder) to obtain guidance features 1270 in guidance space 1275. The guidance features 1270 can be combined with the noisy features 1235 at one or more layers of the reverse diffusion process 1240 to ensure that the output image 1255 includes content described by the text prompt 1260. For example, guidance features 1270 can be combined with the noisy features 1235 using a cross-attention block within the reverse diffusion process 1240.

Figure 13:
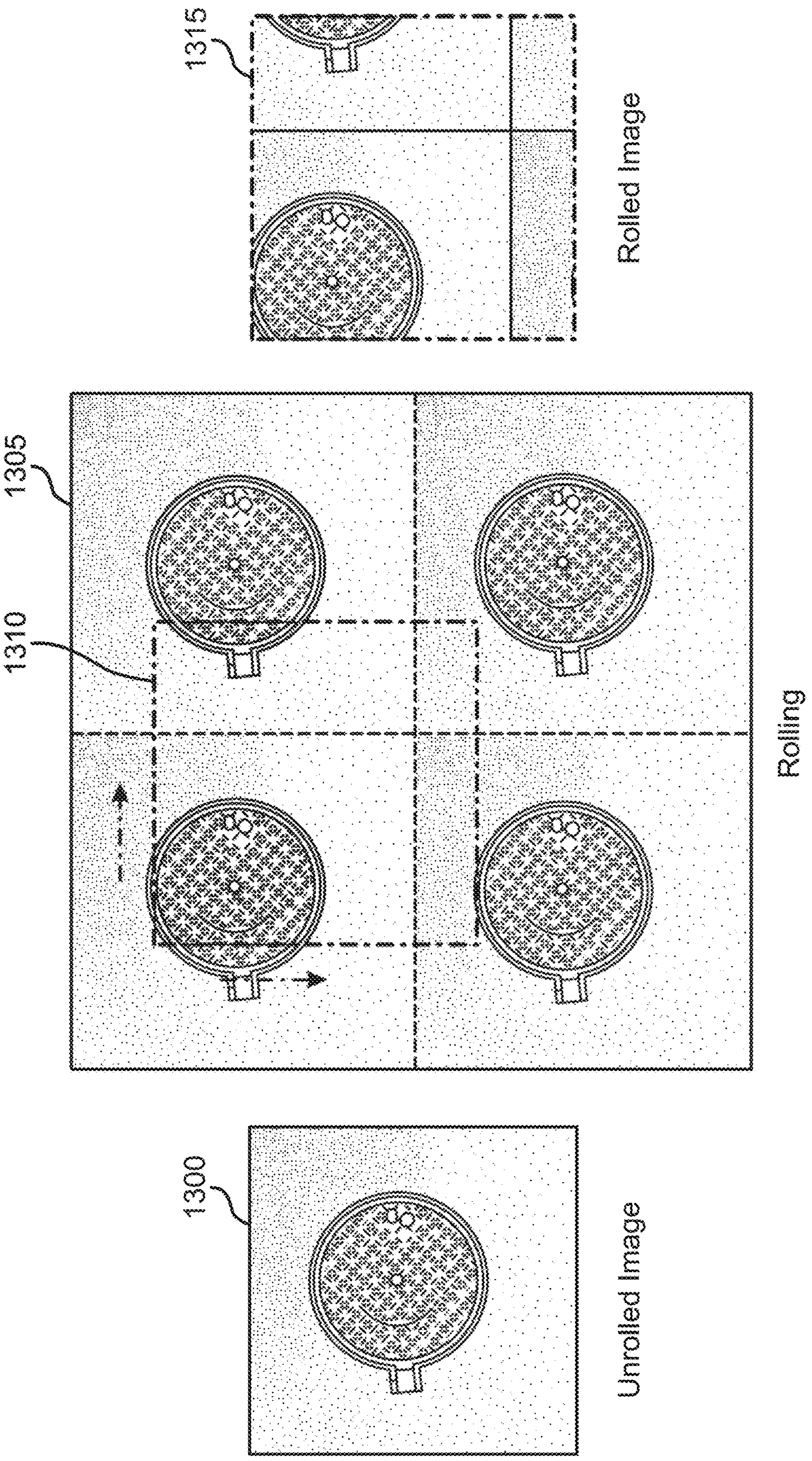
FIG. 13 shows an example of noise rolling according to aspects of the present disclosure.

FIG. 13 shows an example of noise rolling according to aspects of the present disclosure. The example shown includes unrolled image 1300, replicated image 1305, coordinate frame 1310, and rolled image 1315.

The input (unrolled image 1300) is "rolled" over the x and y axes by a random translation, represented in FIG. 13 by replicating the image 2×2 and cropping the region contained in the square (i.e., a region identified by coordinate frame 1310). For example, replicated image 1305 includes 2×2 unrolled images 1300. Image generation model 1025 (with reference to FIG. 10) shifts coordinate frame 1310 of the noise input based on the diffusion step to obtain a shifted coordinate frame.

Unrolling involves doing the inverse process. Due to the iterative nature of the diffusion process at inference time, image generation model 1025 (with reference to FIG. 10) performs "rolling" the noise tensor on itself by a random translation (and subsequently unrolling after each diffusion step). This way, image generation model 1025 removes seams stemming from diffusion. Image generation model 1025, using noise rolling and unrolling, provides better consistency between patches, matching the statistics of the generated image at each diffusion step to match the learned distribution. As the learned distribution does not contain seams randomly placed in the images, noise rolling naturally pushes the generation towards tileable images. In some examples, post removing noise, rolled image 1315 is unrolled to obtain a subsequent image.

With regard to noise rolling, assuming x(t) is the noise image at time step t. For each time step t:

$$x(t) = \text{roll}(x(t)) \tag{1}$$

$$x(t+1) = \text{denoise}(x(t)) \tag{2}$$

$$x(t+1) = \text{unroll}(x(t+1)) \tag{3}$$

In the above equations, t is sampled from a predefined noise scheduling function e.g., log SNR. In some examples, roll(*) and unroll(*) takes parameters that defines the behavior of these two functions such as roll stride, etc. Roll stride is the incremental shift in roll value at each diffusion time step:

$$\text{roll\_value} = -(\text{max\_roll} - (\text{iter\_idx} * \text{stride})) \quad (4)$$

$$\text{max\_roll} = \text{width} * \text{roll\_scale} \quad (5)$$

In some examples, roll_scale and stride are selected. In some cases, roll_scale=0.25, stride=5, iter_idx=[0, num_iteratons], num_terations=50.

Figure 14:
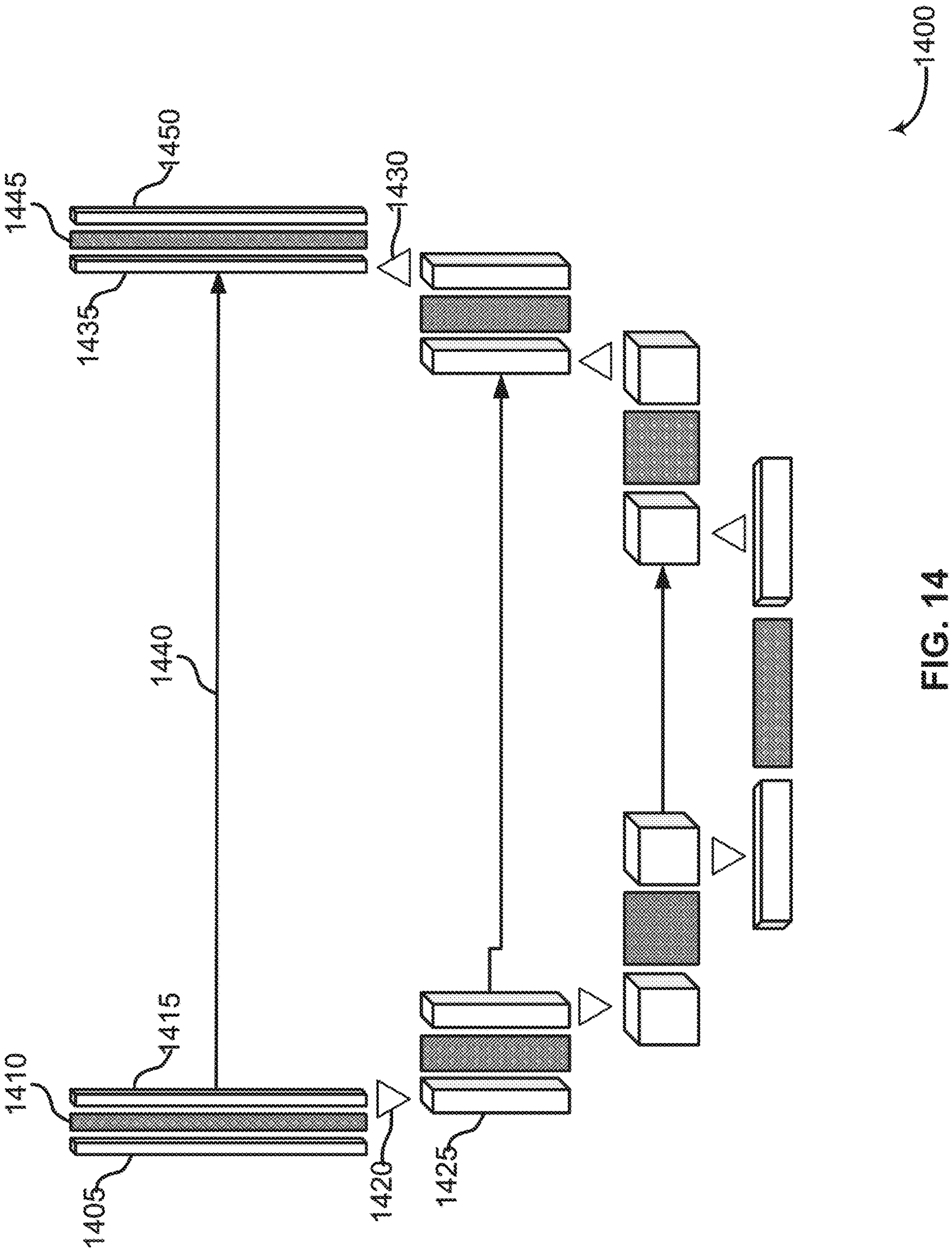
FIG. 14 shows an example of U-Net architecture according to aspects of the present disclosure.

FIG. 14 shows an example of a U-Net 1400 according to aspects of the present disclosure. In some examples, U-Net 1400 is an example of the component that performs the reverse diffusion process 1240 of guided latent diffusion model 1200 described with reference to FIG. 12 and includes architectural elements of the diffusion model 1040 described with reference to FIG. 10. The U-Net 1400 depicted in FIG. 14 is an example of, or includes aspects of, the architecture used within the reverse diffusion process described with reference to FIG. 12.

In some examples, diffusion models are based on a neural network architecture known as a U-Net. The U-Net 1400 takes input features 1405 having an initial resolution and an initial number of channels and processes the input features 1405 using an initial neural network layer 1410 (e.g., a convolutional network layer) to produce intermediate features 1415. The intermediate features 1415 are then down-sampled using a down-sampling layer 1420 such that down-sampled features 1425 features have a resolution less than the initial resolution and a number of channels greater than the initial number of channels.

This process is repeated multiple times, and then the process is reversed. That is, the down-sampled features 1425 are up-sampled using up-sampling process 1430 to obtain up-sampled features 1435. The up-sampled features 1435 can be combined with intermediate features 1415 having the same resolution and number of channels via a skip connection 1440. These inputs are processed using a final neural network layer 1445 to produce output features 1450. In some cases, the output features 1450 have the same resolution as the initial resolution and the same number of channels as the initial number of channels.

In some cases, U-Net 1400 takes additional input features to produce conditionally generated output. For example, the additional input features could include a vector representation of an input prompt. The additional input features can be combined with the intermediate features 1415 within the neural network at one or more layers. For example, a cross-attention module can be used to combine the additional input features and the intermediate features 1415.

In FIGS. 10-14, an apparatus and method for image generation are described. One or more embodiments of the apparatus and method include at least one processor; at least one memory including instructions executable by the at least one processor; and an image generation model comprising parameters in the at least one memory and configured to sample a diffusion step using a noise-based scheduling function, shift a coordinate frame of a noise input based on the diffusion step to obtain a shifted coordinate frame, and generate a synthetic image by denoising the noise input based on an input prompt and the shifted coordinate frame, wherein the input prompt comprises a pattern element and the synthetic image comprises a repetition of the pattern element.

In some examples, the image generation model comprises a diffusion model. In some examples, the image generation model comprises a sharpness classifier configured to apply sharpness classifier guidance to the noise input. In some examples, the image generation model comprises a prompt augmentation component configured to add a pre-determined pattern term to a preliminary prompt to obtain the input prompt. Some examples of the apparatus and method further include a vectorization component configured to vectorize the synthetic image to obtain a vector image.

Vector Graphic Pattern Generation

Figure 15:
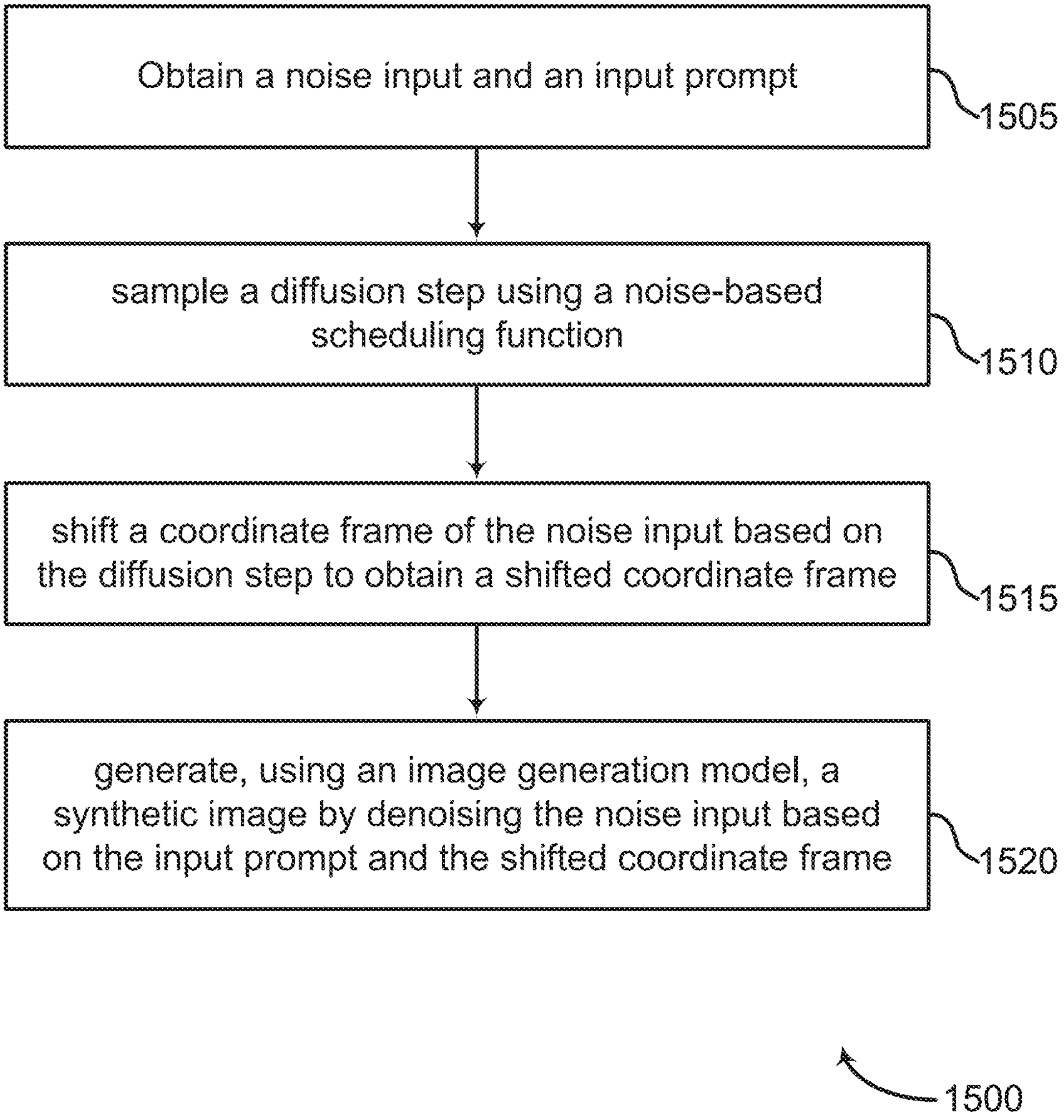
FIG. 15 shows an example of a method for text-to-pattern generation according to aspects of the present disclosure.

FIG. 15 shows an example of a method 1500 for text-to-pattern generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system obtains a noise input and an input prompt. In some examples, the system obtains a preliminary prompt including a pattern element. A pre-determined pattern term is added to the preliminary prompt to obtain the input prompt. In some cases, the operations of this step refer to, or may be performed by, an image generation model or more specifically a prompt augmentation component as described with reference to FIGS. 10 and 11.

In some examples, a positive prompt is added to a preliminary prompt (e.g., a text prompt) to obtain an input prompt (see operation 1510). An example of a positive prompt is "pattern of flower", instructing or guiding a model for image generation. The input prompt is then input to a diffusion model. In some examples, a negative prompt is used to guide a model on what not to generate. The negative prompt is not added to the preliminary prompt. The negative prompt may include one or more pre-determined negative phrases.

In some cases, a prompt augmentation component is configured to perform prompt augmentation and condition a diffusion model. Accordingly, the relevance and quality of synthetic images are increased. By incorporating words or phrases that indicate or include "clean" and "systematic" after a preliminary input prompt, an image generation model can generate synthetic patterns that are more organized and cleaner.

In some examples, in addition to positive prompts, negative prompts (or anchor prompts) are also used for text-to-pattern generation. An anchor prompt is used to guide the image generation model to avoid generating unwanted elements (or objects) in synthetic images. The anchor prompt is used to eliminate artifacts, cluttered, distorted, dull, entangled characteristics from synthetic images. This way, users have increased control over the model output.

At operation 1510, the system samples a diffusion step using a noise-based scheduling function. In some examples, the noise-based scheduling function increases a sampling density as a level of a noise of the noise input decreases. In some cases, the operations of this step refer to, or may be performed by, an image generation model as described with reference to FIGS. 10 and 11.

At operation 1515, the system shifts a coordinate frame of the noise input based on the diffusion step to obtain a shifted coordinate frame. In some cases, the operations of this step refer to, or may be performed by, an image generation model as described with reference to FIGS. 10 and 11.

In some examples, the system applies sharpness classifier guidance on the noise input to obtain conditioned noise. In some cases, the operations of applying sharpness classifier guidance refer to, or may be performed by, a sharpness classifier as described with reference to FIGS. 10 and 11.

In some embodiments, classifier guidance is used to further condition the image generation model (e.g., a diffusion model) by guiding the image generation process. Different types of classifier guidance may be used to improve text-to-pattern generation. In some examples, sharpness classifier guidance is used to improve the sharpness during the sampling process. This results in images with crisper and more defined edges, thereby improving the overall visual appeal of the generated patterns. Additionally, sharpness classifier guidance can remove small artifacts that can detract from the quality of synthetic images. At the same time, the color integrity of synthetic image is increased, ensuring that the generated patterns have vibrant and appealing color schemes.

As for the noise predicted by the model at each time step, sharpness classifier guidance is computed as below. In some examples, val=0.25 and channels=[−1]. There are 4 channels in the noise predicted by image generation model 1025 (see FIG. 10) in a latent space. The sharpness classifier guidance is applied to the last channel.

TABLE 1

Sharpness classifier guidance.

```
def T(x):
  return x − gaussian_blur(x, kernel_size = [11, 11], sigma = [10.5, 10.5])
for channel in channels:
  iterate[:, channel, ...] = iterate[:, channel, ...] + val * T(torch.sign(T(iterate[:, channel,
  ...])))
```

At operation 1520, the system generates, using an image generation model, a synthetic image by denoising the noise input based on the input prompt and the shifted coordinate frame. In some cases, additionally or alternatively, the system generates the synthetic image by denoising the noise input based on the sharpness classifier guidance and the conditioned noise. The synthetic image includes a repetition of the pattern element. In some cases, the operations of this step refer to, or may be performed by, an image generation model as described with reference to FIGS. 10 and 11.

In some embodiments, the image generation model (e.g., a text to vector graphic pattern model) generates aesthetically pleasing and seamless patterns across a diverse range of styles and categories. From example experiments comprising qualitative evaluation of the synthetic images generated by the image generation model, the image generation model described in embodiments of the present disclosure outperforms conventional systems across various patterns given input prompts (e.g., captions).

Figure 16:
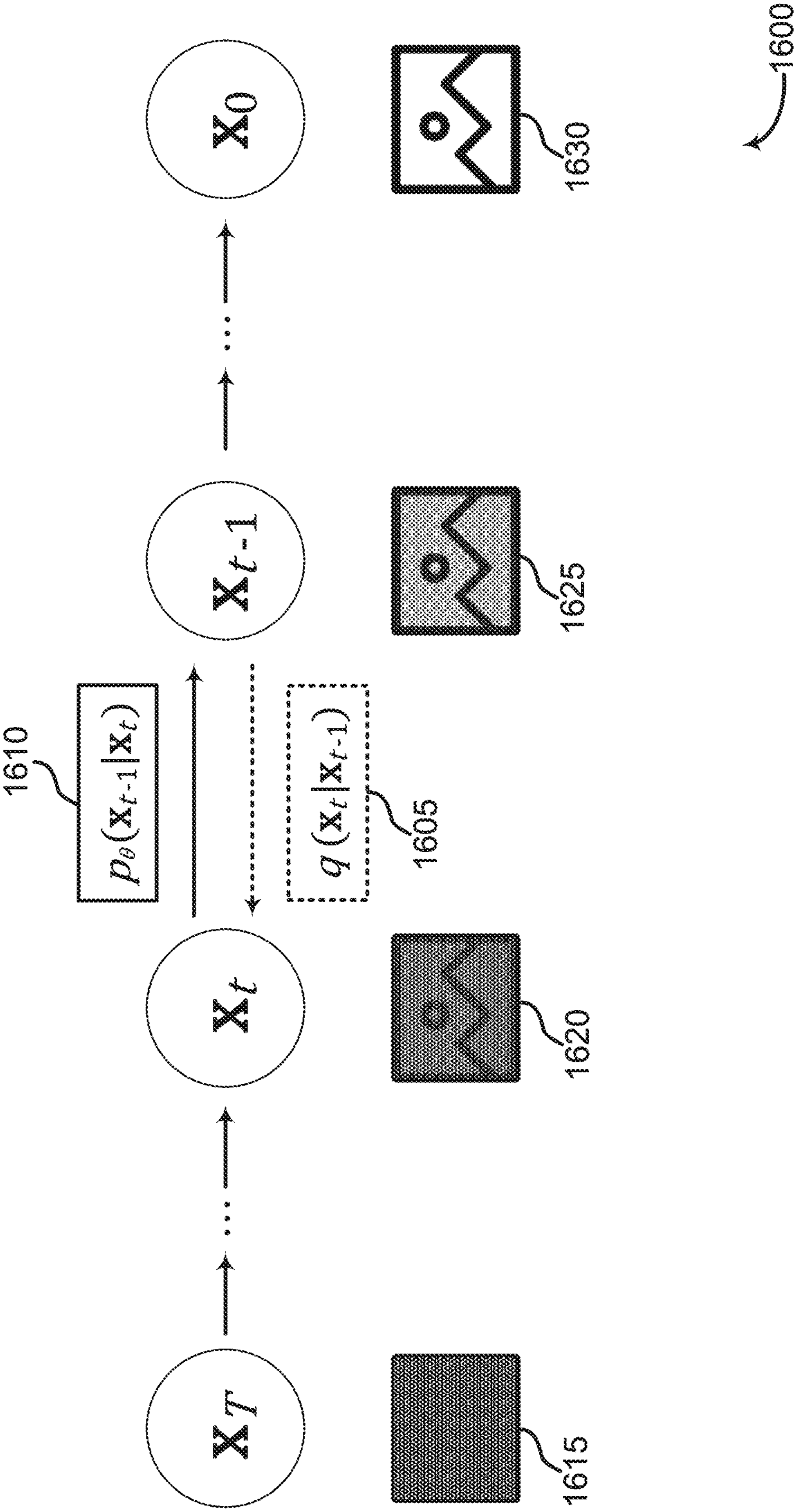
FIG. 16 shows an example of a diffusion process according to aspects of the present disclosure.

FIG. 16 shows an example of a diffusion process 1600 according to aspects of the present disclosure. In some examples, diffusion process 1600 describes an operation of the diffusion model 1040 described with reference to FIG. 10, such as the reverse diffusion process 1240 of guided latent diffusion model 1200 described with reference to FIG. 12.

As described above with reference to FIG. 12, using a diffusion model can involve both a forward diffusion process 1605 for adding noise to a media item (or features in a latent space) and a reverse diffusion process 1610 for denoising the media item (or features) to obtain a denoised media item. The forward diffusion process 1605 can be represented as $q(x_t|x_{t-1})$, and the reverse diffusion process 1610 can be represented as $p(x_{t-1}|x_t)$. In some cases, the forward diffusion process 1605 is used during training to generate media items with successively greater noise, and a neural network is trained to perform the reverse diffusion process 1610 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1610, the model begins with noisy data $x_T$, such as a noisy media item 1615 and denoises the data to obtain the $p(x_{t-1}|x_t)$. At each step t−1, the reverse diffusion process 1610 takes $x_t$, such as first intermediate media item 1620, and t as input. Here, t represents a step in the sequence of transitions associated with different noise levels, The reverse diffusion process 1610 outputs $x_{t-1}$, such as second intermediate media item 1625 iteratively until $x_T$ reverts back to $x_0$, the original media item 1630. The reverse process can be represented as:

$$p_\theta(x_{t-1}|x_t) := N(x_{t-1}; \mu_\theta(x_t, t), \Sigma_\theta(x_t, t)). \quad (6)$$

The joint probability of a sequence of samples in the Markov chain can be written as a product of conditionals and the marginal probability:

$$x_T: p_\theta(x_{0:T}) := p(x_T)\prod_{t=1}^{T} p_\theta(x_{t-1}|x_t), \quad (7)$$

where $p(x_T)=N(x_T; 0,I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At inference time, observed data $x_0$ in a pixel space can be mapped into a latent space as input and a generated data $\tilde{x}$ is mapped back into the pixel space from the latent space as output. In some examples, $x_0$ represents an original input media item with low quality, latent variables $x_1, \ldots, x_T$ represent noisy media items, and x represents the generated item with high quality.

In FIGS. 15-16, a method, apparatus, and non-transitory computer readable medium for image generation are described. One or more embodiments of the method, apparatus, and non-transitory computer readable medium include obtaining a noise input and a preliminary prompt comprising a pattern element; adding a pre-determined pattern term to the preliminary prompt to obtain an input prompt; sampling a diffusion step using a noise-based scheduling function, wherein the noise-based scheduling function increases a sampling density as a level of a noise of the noise input decreases; shifting a coordinate frame of the noise input based on the diffusion step to obtain a shifted coordinate frame; applying sharpness classifier guidance on the noise input to obtain conditioned noise; and generating, using an image generation model, a synthetic image by denoising the noise input based on the input prompt, the shifted coordinate frame, the sharpness classifier guidance, and the conditioned noise, wherein the synthetic image comprises a repetition of the pattern element.

Some examples of the method, apparatus, and non-transitory computer readable medium further include iteratively obtaining an updated noise input, sampling an subsequent diffusion step based on a level of noise of the updated noise input, shifting the updated noise input based on the subsequent diffusion step to obtain an iterative shifted noise input, generating iterative sharpness classifier guidance based on the shifted updated noise input, and removing noise from the iterative shifted noise input based on the input prompt and the iterative sharpness classifier guidance to update the updated noise input.

Figure 17:
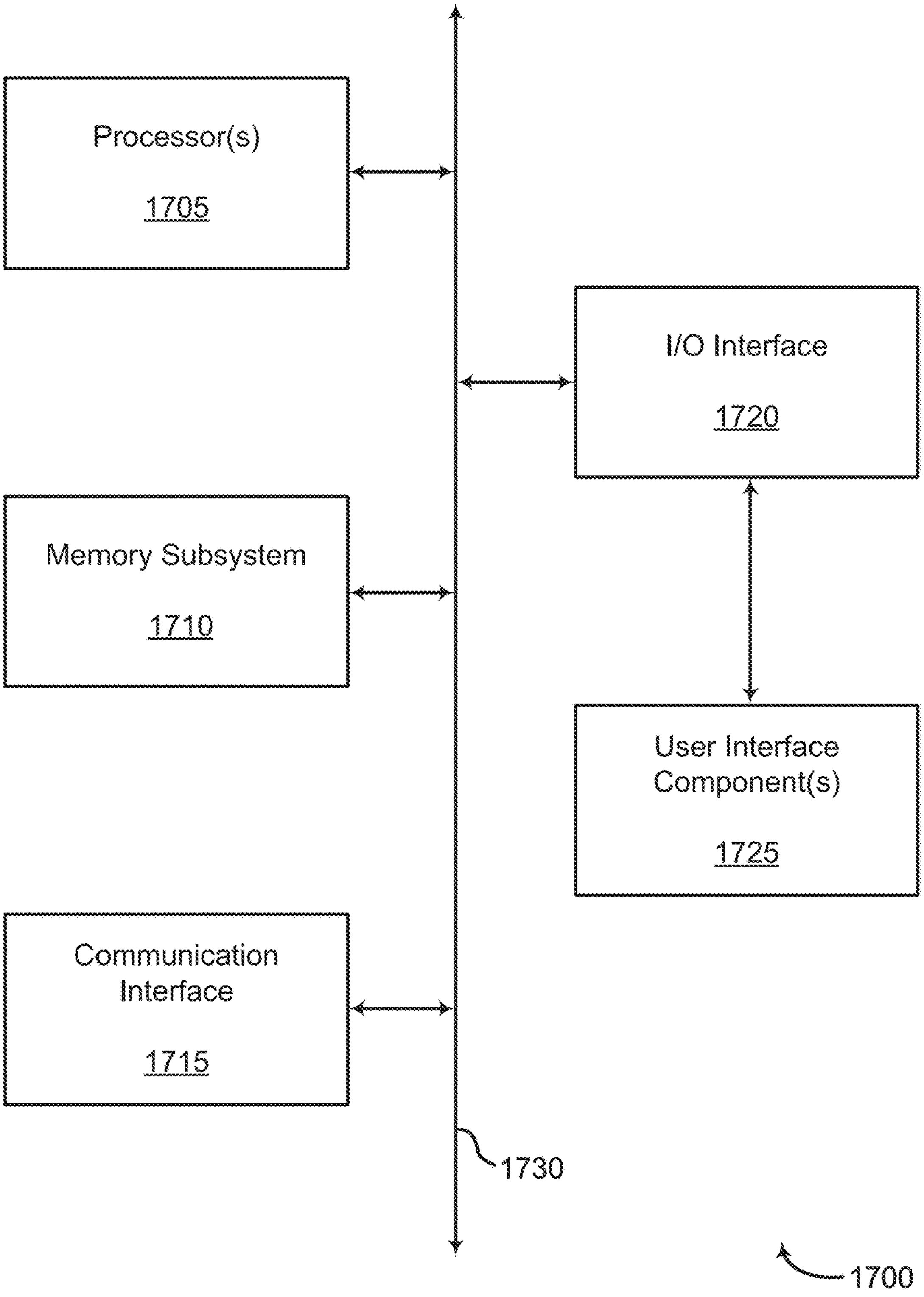
FIG. 17 shows an example of a computing device for image generation according to aspects of the present disclosure.

FIG. 17 shows an example of a computing device 1700 for image generation according to aspects of the present disclosure. The example shown includes computing device 1700, processor(s) 1705, memory subsystem 1710, communication interface 1715, I/O interface 1720, user interface component(s) 1725, and channel 1730. In one embodiment, computing device 1700 includes processor(s) 1705, memory subsystem 1710, communication interface 1715, I/O interface 1720, user interface component(s) 1725, and channel 1730.

In some embodiments, computing device 1700 is an example of, or includes aspects of, image generation apparatus 110 of FIG. 1. In some embodiments, computing device 1700 includes one or more processors 1705 that can execute instructions stored in memory subsystem 1710 to obtain a noise input and an input prompt comprising a pattern element; sample a diffusion step using a noise-based scheduling function; shift a coordinate frame of the noise input based on the diffusion step to obtain a shifted coordinate frame; and generate, using an image generation model, a synthetic image by denoising the noise input based on the input prompt and the shifted coordinate frame, wherein the synthetic image comprises a repetition of the pattern element.

According to some embodiments, computing device 1700 includes one or more processors 1905. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1710 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1715 operates at a boundary between communicating entities (such as computing device 1700, one or more user devices, a cloud, and one or more databases) and channel 1730 and can record and process communications. In some cases, communication interface 1715 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1720 is controlled by an I/O controller to manage input and output signals for computing device 1700. In some cases, I/O interface 1720 manages peripherals not integrated into computing device 1700. In some cases, I/O interface 1720 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1720 or via hardware components controlled by the I/O controller.

According to some embodiments, user interface component(s) 1725 enable a user to interact with computing device 1700. In some cases, user interface component(s) 1725 include an audio device, such as an external speaker system, an external display device such as a display screen, an input device (e.g., a remote control device interfaced with a user interface directly or through the I/O controller), or a combination thereof. In some cases, user interface component(s) 1725 include a GUI.

Performance of apparatus, systems and methods of the present disclosure have been evaluated, and results indicate embodiments of the present disclosure have obtained increased performance over existing technology. Example experiments demonstrate that the image generation apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a noise input and an input prompt comprising a pattern element;

shifting a coordinate frame of the noise input based on a diffusion step to obtain a shifted coordinate frame; and generating, using an image generation model, a synthetic image by denoising the noise input based on the input prompt and the shifted coordinate frame, wherein the synthetic image comprises a repetition of the pattern element.

2. The method of claim 1, wherein generating the synthetic image comprises:

iteratively obtaining an updated noise input, sampling an subsequent diffusion step based on a level of noise of the updated noise input, shifting the updated noise input based on the subsequent diffusion step to obtain an iterative shifted noise input, and removing noise from the iterative shifted noise input based on the input prompt to update the updated noise input.

3. The method of claim 1, further comprising:

unrolling the denoised noise input based on the diffusion step to update the denoised noise input, wherein the synthetic image is generated based on the unrolling.

4. The method of claim 1, wherein:

the diffusion step is sampled based on a noise-based scheduling function.

5. The method of claim 4, wherein:

the scheduling function is based on a log signal-to-noise ratio (logSNR) function.

6. The method of claim 1, wherein shifting the coordinate frame comprises:

obtaining a roll value based on the diffusion step, wherein the coordinate frame is shifted by the roll value.

7. The method of claim 6, further comprising:

identifying a roll stride value, wherein the roll value is obtained based on the roll stride value.

8. The method of claim 1, wherein shifting the coordinate frame comprises:

shifting a horizontal coordinate and a vertical coordinate of the coordinate frame.

9. The method of claim 1, wherein shifting the coordinate frame comprises:

equating opposite edges of the noise input.

10. The method of claim 1, wherein obtaining the input prompt comprises:

obtaining a preliminary prompt; and adding a pre-determined pattern term to the preliminary prompt to obtain the input prompt.

11. The method of claim 1, further comprising:

obtaining a negative prompt, wherein the synthetic image is generated based on the negative prompt.

12. The method of claim 1, further comprising:

applying sharpness classifier guidance on the noise input to obtain conditioned noise, wherein the synthetic image is generated based on the sharpness classifier guidance and the conditioned noise.

13. The method of claim 1, further comprising:

vectorizing the synthetic image to obtain a vector image.

14. A non-transitory computer readable medium storing code for image processing, the code comprising instructions that, when executed by at least one processor, causes the at least one processor to perform operations comprising:

obtaining a noise input and an input prompt;

sampling a diffusion step using a noise-based scheduling function;

shifting a coordinate frame of the noise input based on the diffusion step to obtain a shifted coordinate frame; and generating, using an image generation model, a synthetic image by denoising the noise input based on the input prompt and the shifted coordinate frame.

15. The non-transitory computer readable medium of claim 14, wherein generating the synthetic image comprises:

iteratively obtaining an updated noise input, sampling an subsequent diffusion step based on a level of noise of the updated noise input, shifting the updated noise input based on the subsequent diffusion step to obtain an iterative shifted noise input, generating sharpness classifier guidance based on the shifted updated noise input, and removing noise from the iterative shifted noise input based on the input prompt and the iterative sharpness classifier guidance to update the updated noise input.

16. An apparatus comprising:

at least one processor;

at least one memory including instructions executable by the at least one processor; and an image generation model comprising parameters in the at least one memory and configured to sample a diffusion step using a noise-based scheduling function, shift a coordinate frame of a noise input based on the diffusion step to obtain a shifted coordinate frame, and generate a synthetic image by denoising the noise input based on an input prompt and the shifted coordinate frame, wherein the input prompt comprises a pattern element and the synthetic image comprises a repetition of the pattern element.

17. The apparatus of claim 16, wherein:

the image generation model comprises a diffusion model.

18. The apparatus of claim 16, wherein:

the image generation model comprises a sharpness classifier configured to apply sharpness classifier guidance on the noise input.

19. The apparatus of claim 16, wherein:

the image generation model comprises a prompt augmentation component configured to add a pre-determined pattern term to a preliminary prompt to obtain the input prompt.

20. The apparatus of claim 16, further comprising:

a vectorization component configured to vectorize the synthetic image to obtain a vector image.

* * * * *